(12) United States Patent
Kim et al.

(10) Patent No.: US 11,190,716 B2
(45) Date of Patent: Nov. 30, 2021

(54) IMAGE PROCESSING SYSTEM, IMAGE SENSOR, AND METHOD FOR DRIVING IMAGE SENSOR

(71) Applicant: SK hynix Inc., Gyeonggi-do (KR)

(72) Inventors: Jin Seon Kim, Seoul (KR); Min Seok Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 62 days.

(21) Appl. No.: 16/657,724

(22) Filed: Oct. 18, 2019

(65) Prior Publication Data

US 2020/0314361 A1    Oct. 1, 2020

(30) Foreign Application Priority Data

Mar. 25, 2019 (KR) .................. 10-2019-0033531

(51) Int. Cl.
*H04N 5/347* (2011.01)
*H04N 9/04* (2006.01)
*H04N 5/369* (2011.01)

(52) U.S. Cl.
CPC ......... *H04N 5/347* (2013.01); *H04N 5/36961* (2018.08); *H04N 9/04551* (2018.08)

(58) Field of Classification Search
CPC ............... H04N 5/347; H04N 9/04551; H04N 5/36961; H04N 5/37457; H04N 5/3765; H04N 5/341; H04N 5/374; H04N 5/378
See application file for complete search history.

(56) References Cited

U.S. PATENT DOCUMENTS

| 2009/0096886 | A1* | 4/2009 | Kusaka | H04N 5/36961 348/222.1 |
| 2009/0219423 | A1* | 9/2009 | Suzuki | H04N 5/23212 348/302 |
| 2009/0289169 | A1* | 11/2009 | Yang | H04N 5/3742 250/201.2 |
| 2013/0113967 | A1* | 5/2013 | Wang | H04N 5/37457 348/302 |
| 2015/0062102 | A1* | 3/2015 | Ikeda | H04N 5/3696 345/207 |
| 2017/0099449 | A1* | 4/2017 | Kang | H04N 5/232122 |
| 2018/0352199 | A1* | 12/2018 | Hwang | H01L 27/14605 |

FOREIGN PATENT DOCUMENTS

| KR | 10-2015-0082907 | 7/2015 |
| KR | 10-2016-0086135 | 7/2016 |

* cited by examiner

*Primary Examiner* — Nhan T Tran
(74) *Attorney, Agent, or Firm* — IP & T Group LLP

(57) ABSTRACT

An image sensor includes a pixel array including plural first pixels and a second pixel, and a row decoder configured to supply a second row selection signal to the second pixel and a first pixel that is coupled to the same column line as the second pixel and is accessed simultaneously with the second pixel in a binning mode, and supply a first row selection signal to a remaining first pixel.

20 Claims, 12 Drawing Sheets

FIG. 4

IMAGE PROCESSING SYSTEM, IMAGE SENSOR, AND METHOD FOR DRIVING IMAGE SENSOR

CROSS-REFERENCE TO RELATED APPLICATION

This patent document claims priority based upon Korean patent application No. 10-2019-0033531, filed on Mar. 25, 2019, the disclosure of which is incorporated in its entirety by reference herein.

TECHNICAL FIELD

Embodiments of the disclosed technology generally relate to an image processing system, an image sensor, and a method for driving the image sensor, and more particularly to an image processing system including a normal mode and a binning mode, an image sensor, and a method for driving the image sensor.

BACKGROUND

An image sensing device typically captures at least one image using semiconductor characteristics that react to light. In recent times, with the increasing development of computer industries and communication industries, demand for high-quality and high-performance image sensors is rapidly increasing in various fields, for example, smartphones, digital cameras, game consoles, Internet of Things (IoT), robots, surveillance cameras, medical micro-cameras, etc.

Image sensors may be broadly classified into a Charge Coupled Device (CCD)-based image sensor and a Complementary Metal Oxide Semiconductor (CMOS)-based image sensor. The CCD image sensor may be superior to the CMOS image sensor in terms of noise and image quality. However, the CMOS image sensor may be driven more easily than the CCD image sensor, and may be implemented using many more scanning schemes than those of the CCD image sensor. In addition, the CMOS image sensor may allow a signal processing circuit to be integrated into a single chip, such that the CMOS image sensor can be easily fabricated as a small-sized product, has very lower power consumption, and is compatible with CMOS fabrication technology, resulting in reduction in production costs. In recent times, the CMOS image sensor has been designed to be more compatible with mobile devices, such that CMOS image sensing devices have been intensively researched and rapidly come into widespread use.

SUMMARY

Various embodiments of the disclosed technology are directed to providing an image processing system, an image sensor, and a method for driving the image sensor that substantially address one or more issues due to limitations and disadvantages of the related art.

Embodiments of the disclosed technology relate to an image processing system capable of performing an autofocus operation even in a binning mode, an image sensor, and a method for driving the image sensor.

In accordance with an embodiment of the disclosed technology, an image sensor includes a pixel array including plural first pixels and a second pixel, and a row decoder configured to supply a second row selection signal to the second pixel and a first pixel that is coupled to the same column line as the second pixel and is accessed simultaneously with the second pixel in a binning mode, and supply a first row selection signal to a remaining first pixel.

The second row selection signal may be controlled in a manner that a pixel signal of a color pixel of the first pixel, which is accessed simultaneously with a phase detection pixel of the second pixel, is not output to the column line.

The second row selection signal may have a high level in a section corresponding to the phase detection pixel of the second pixel, and has a low level in a section corresponding to a color pixel of the first pixel that is accessed simultaneously with the phase detection pixel.

Each of the first pixels may be a shared pixel provided with a plurality of color pixels. The second pixel may be shared pixel provided with at least one phase detection pixel.

The plurality of color pixels disposed in each of the first pixels may be arranged in a Bayer pattern. The phase detection pixel disposed in the second pixel may be arranged at a position of a green pixel of the Bayer pattern.

The phase detection pixel disposed in the second pixel may be a half-shielded pixel.

The row decoder may include a first signal generator configured to generate the first row selection signal that transmits a row selection input signal to at least one row selected by a row address signal, and a second signal generator configured to generate the second row selection signal based on a binning enable signal indicating whether the binning mode is activated, a pixel position signal decided by an arrangement relationship between the first pixel and the second pixel, the first row selection signal, and a pixel masking signal by which a pixel signal of a color pixel of the first pixel that is accessed simultaneously with a phase detection pixel of the second pixel is controlled not to be output to the column line.

The second signal generator may include an output selection circuit configured to generate a first multiplexer (MUX) selection signal based on the binning enable signal and the pixel position signal, and may generate a second multiplexer (MUX) selection signal based on the binning enable signal and an inversion value of the pixel position signal.

The second signal generator may further include a plurality of multiplexers configured to receive any one of the first multiplexer (MUX) selection signal and the second multiplexer (MUX) selection signal through a selection terminal. Each of the multiplexers selects any one of the first row selection signal and a specific signal that is generated based on the first row selection signal and the pixel masking signal, and outputs the selected signal as the second row selection signal.

The multiplexer receiving the first multiplexer (MUX) selection signal may output the second row selection signal to the second pixel. The multiplexer receiving the second multiplexer (MUX) selection signal may output the second row selection signal to the first pixel.

The pixel masking signal may have a low level in a section in which a pixel signal of the phase detection pixel of the second pixel is output.

The row decoder may include a first signal generator configured to generate the first row selection signal that transmits a first row selection input signal to at least one row selected by a row address signal, and a second signal generator configured to generate the second row selection signal based on a binning enable signal indicating whether the binning mode is activated, a pixel position signal decided by an arrangement relationship between the first pixel and the second pixel, the first row selection signal, and a second row selection input signal that provides a time point at which a pixel signal of each color pixel of the first pixel that is accessed simultaneously with a phase detection pixel of the second pixel is prevented from being output to the column line.

The second signal generator may include an output selection circuit configured to generate a first multiplexer (MUX) selection signal based on the binning enable signal and the pixel position signal, and may generate a second multiplexer (MUX) selection signal based on the binning enable signal and an inversion value of the pixel position signal.

The second signal generator may further include a plurality of multiplexers configured to receive any one of the first multiplexer (MUX) selection signal and the second multiplexer (MUX) selection signal through a selection terminal. Each of the multiplexers selects any one of the first row selection signal and a preliminary row selection signal that is generated based on the second row selection signal and the row address signal, and outputs the selected signal as the second row selection signal.

The multiplexer receiving the first multiplexer (MUX) selection signal may output the second row selection signal to the second pixel. The multiplexer receiving the second multiplexer (MUX) selection signal may output the second row selection signal to the first pixel.

The preliminary row selection signal may have a low level in a section in which a pixel signal of the phase detection pixel of the second pixel is output.

In accordance with another embodiment of the disclosed technology, a method for driving an image sensor provided with a pixel array comprised of plural first pixels and a second pixel includes generating a second row selection signal to be supplied to the second pixel and a first pixel that is coupled to the same column line as the second pixel and is accessed simultaneously with the second pixel in a binning mode, and generating a first row selection signal to be supplied to a remaining first pixel.

The generating the second row selection signal may include generating the second row selection signal based on a pixel masking signal and the first row selection signal, wherein the pixel masking signal has a low level only in a section in which a pixel signal of a phase detection pixel of the second pixel is output.

The generating the second row selection signal may include generating a preliminary row selection signal that has a low level in a section in which the pixel signal of the phase detection pixel of the second pixel is output, as the second row selection signal.

In accordance with yet another embodiment of the disclosed technology, an image processing system includes an image sensor and an image signal processor. The image sensor includes a pixel array provided with plural first pixels and a second pixel, and a row decoder that provides a second row selection signal to the second pixel and a first pixel that is coupled to the same column line as the second pixel and is accessed simultaneously with the second pixel in a binning mode, and provides a first row selection signal to a remaining first pixel. The image signal processor detects a phase difference using an image of the second pixel in the binning mode.

In accordance with yet another embodiment of the disclosed technology, an image sensor includes a first sub-pixel array, a second sub-pixel array including a phase detection sub-pixel, the first and second sub-pixel arrays electrically coupled to a column line and different row selection lines, and a decoder configured to simultaneously provide the first and second sub-pixel arrays respectively with first and second row selection signals through the row selection lines in a binning mode. The second row selection signal allows sub-pixels within the second sub-pixel array to sequentially output pixel signals through the column line. The first row selection signal allows sub-pixels within the first sub-pixel array to sequentially output pixel signals through the column line except for a sub-pixel having the same turn to output a pixel signal as the phase detection sub-pixel within the first and second sub-pixel arrays.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

FIG. 4 is a structural diagram illustrating one example of a pixel group PG shown in FIG. 2 and a line structure for supplying a row selection signal to the pixel group PG.

DETAILED DESCRIPTION

Figure 1:
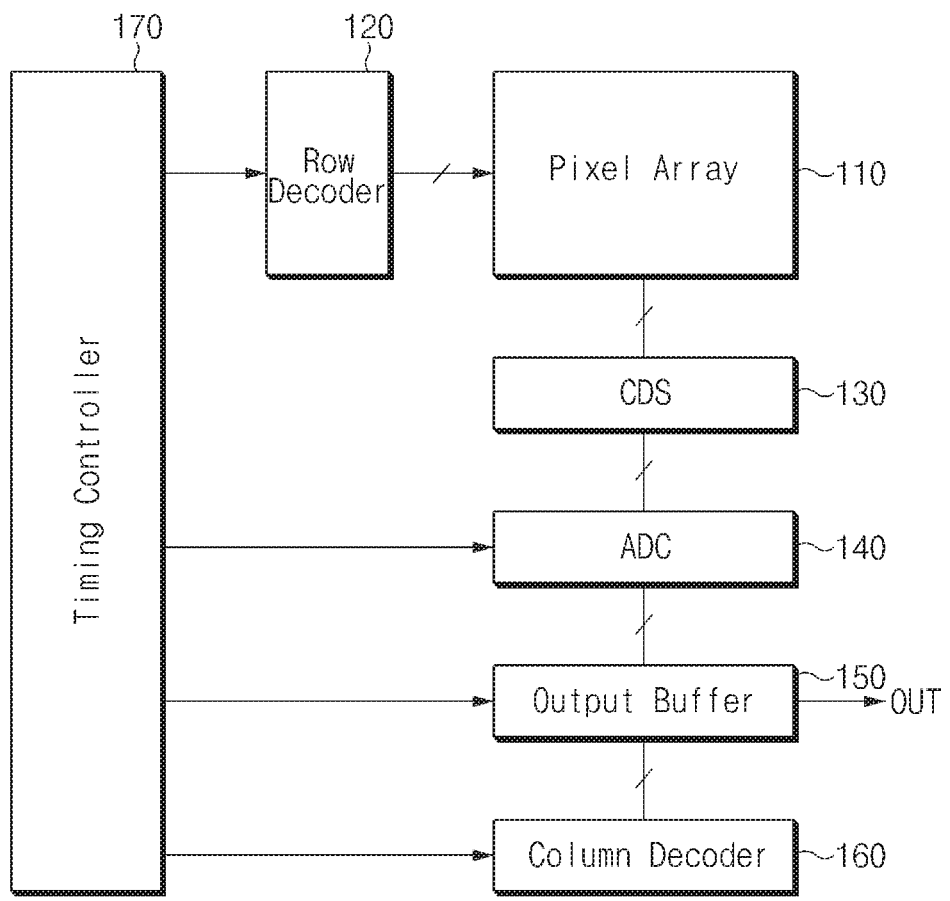
FIG. 1 is a block diagram illustrating an image sensor in accordance with an embodiment of the disclosed technology.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein, but on the contrary, the disclosure is intended to cover all modifications, equivalents, and alternatives falling within the spirit and scope of the embodiments. In the drawings, the sizes and shapes of elements may be exaggerated for convenience and clarity of description.

FIG. 1 is a block diagram illustrating an image sensor 100 in accordance with an embodiment of the disclosed technology.

Referring to FIG. 1, the image sensor 100 may include a pixel array 110, a row decoder 120, a correlated double sampling (CDS) circuit 130, an analog-to-digital converter (ADC) 140, an output buffer 150, a column decoder 160, and a timing controller 170. In this case, the above-mentioned elements of the image sensor 100 are merely examples, and some elements may be added to or omitted from the image sensor 100 as necessary.

The pixel array 110 may include a plurality of pixels arranged in a two-dimensional (2D) shape. Each of the pixels may convert incident light into an electrical signal. The pixel array 110 may receive a drive signal that includes a row selection signal, a pixel reset signal, a transmission (Tx) signal, and the like from the row decoder 120, and may be driven by the drive signal received from the row decoder 120.

The row decoder 120 may select at least one row from the pixel array 110 under control of the timing controller 170. The row decoder 120 may generate a row selection signal to select at least one of a plurality of rows. The row decoder 120 may sequentially enable a pixel reset signal for pixels corresponding to at least one selected row, and a transmission (Tx) signal for the pixels. As a result, an analog-type reference signal and an image signal that are generated from each pixel of the selected row may be sequentially transmitted to the CDS circuit 130. In this case, the reference signal and the image signal may be generically be referred to as a pixel signal.

The CDS circuit 130 may sequentially sample and hold the reference signal and the image signal that are transferred from the pixel array 110 to each of the plurality of column lines. That is, the CDS circuit 130 may sample and hold levels of the reference signal and the image signal that correspond to each column of the pixel array 110.

The CDS circuit 130 may transmit a correlated double sampling (CDS) signal corresponding to the reference signal and the image signal for each column to the ADC 140 upon receiving a control signal from the timing controller 170.

The ADC 140 may receive the CDS signal for each column from the CDS circuit 130, may convert the received CDS signal into a digital signal, and may thus output the digital signal. The ADC 140 may perform counting and calculation operations based on the CDS signal for each column and a ramp signal received from the timing controller 170, such that the ADC 140 may generate digital image data from which noise (for example, unique reset noise for each pixel) corresponding to each column is removed.

The ADC 140 may include a plurality of column counters corresponding to respective columns of the pixel array 110, and may convert the CDS signal for each column into a digital signal using the column counters. In accordance with an embodiment, the ADC 140 may include a single global counter, and may convert a CDS signal corresponding to each column into a digital signal using a global code received from the global counter.

The output buffer 150 may receive image data for each column received from the ADC 140, may capture the received image data, and may output the captured image data. The output buffer 150 may temporarily store image data that is output from the ADC 140 upon receiving a control signal from the timing controller 170. The output buffer 150 may operate as an interface configured to compensate for a difference in transmission (Tx) speed (or in processing speed) between the image sensor 100 and another device coupled to the image sensor 100.

The column decoder 160 may select a column of the output buffer 150 upon receiving a control signal from the timing controller 170, and may sequentially output the temporarily stored image data to the output buffer 150. In more detail, the column decoder 160 may receive an address signal from the timing controller 170, may generate a column selection signal based on the received address signal, and may select a column of the output buffer 160, such that the column decoder 160 may control image data to be output as an output signal OUT from the selected column of the output buffer 160.

The timing controller 170 may control the row decoder 120, the ADC 140, the output buffer 150, and the column decoder 160.

The timing controller 170 may transmit a clock signal needed for the constituent elements of the image sensor 100, a control signal needed for timing control, and address signals needed for selection of a row or column to the row decoder 120, the column decoder 160, the ADC 140, and the output buffer 150. In accordance with the embodiment, the timing controller 170 may include a logic control circuit, a phase locked loop (PLL) circuit, a timing control circuit, a communication interface circuit, etc.

Figure 2:
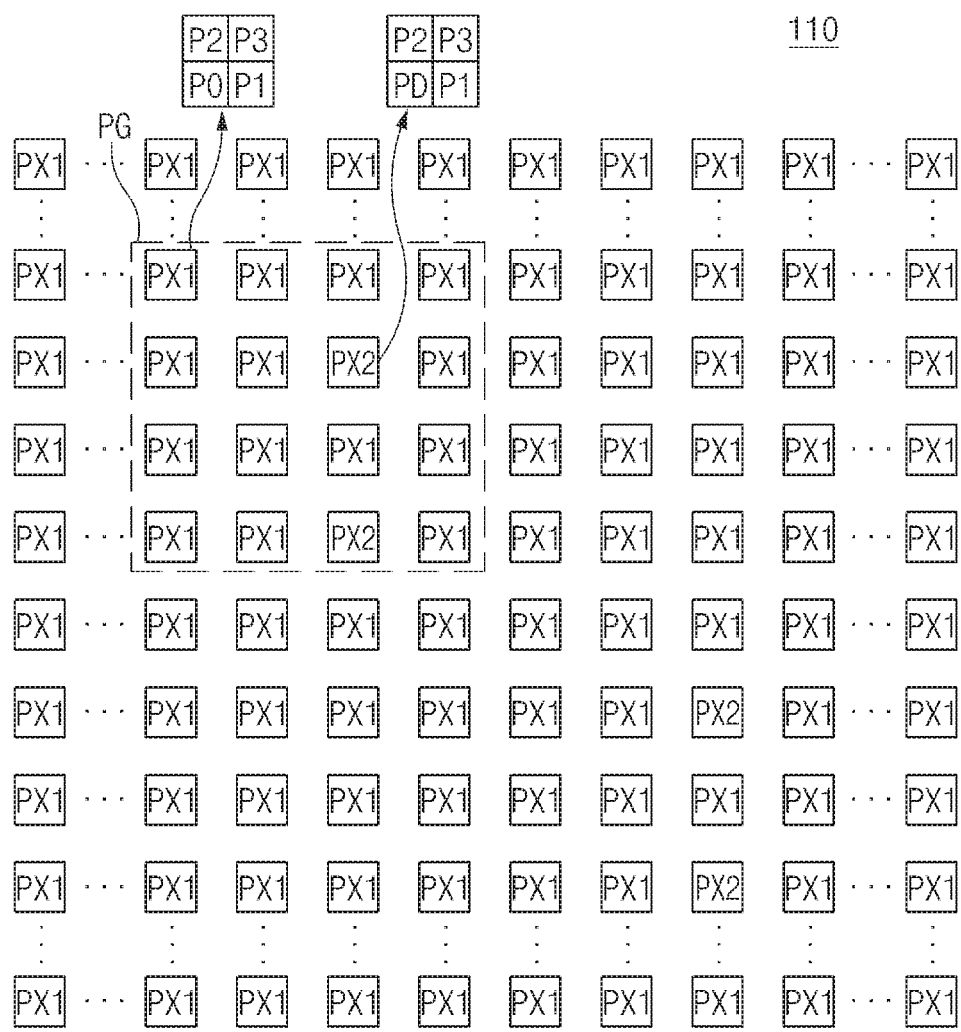
FIG. 2 is a detailed structural diagram illustrating a pixel array shown in FIG. 1.

FIG. 2 is a detailed structural diagram illustrating the pixel array 110 shown in FIG. 1.

Referring to FIG. 2, the pixel array 110 may include a plurality of pixels arranged in a two-dimensional (2D) matrix shape including a plurality of rows and a plurality of columns. Pixel categories contained in the plurality of pixels may be classified into a first pixel PX1 and a second pixel PX2. In accordance with the embodiment, although the plurality of pixels may include other types of pixels such as an optical black pixel needed to remove dark noise, it is assumed that the pixels to be described in the following embodiment include only the first pixel PX1 and the second pixel PX2 for convenience of description and better understanding of the disclosed technology.

Each of the first pixel PX1 and the second pixel PX2 may be a shared pixel including a sub-pixel array composed of 4 sub-pixels. In this case, the shared pixel may divide a light receiving region into a plurality of regions, such that photoelectric conversion elements (i.e., photodiodes) may be respectively arranged in the divided regions. In addition, the shared pixel may be designed by using transistors for generating electrical signals corresponding to photocharges generated by the respective photoelectric conversion elements, which are shared with each other. In other words, each sub-pixels may include an independent photoelectric conversion element, and at least one transistor may be allocated to the sub-pixels such that the sub-pixels can share the at least one transistor with each other. Although each of the first pixel PX1 and the second pixel PX2 includes 4 sub-pixels for convenience of description, the scope or spirit of the disclosed technology is not limited thereto.

The first pixel PX1 may include a sub-pixel array of four sub-pixels P0~P3 arranged in a 2×2 matrix. Each of the sub-pixels P0~P3 may be a color pixel to absorb light having a specific range of wavelengths. To this end, color filters may be disposed in light receiving directions of the respective sub-pixels P0~P3. For example, the color filters may include a red filter, a green filter, and a blue filter arranged in a Bayer pattern. That is, the sub-pixels P0~P3 may be a green pixel, a blue pixel, a red pixel, and a green pixel, respectively. In this case, the numbers 0, 1, 2, and 3 respectively allocated to the four sub-pixels may denote the order of outputting electrical signals corresponding to the respective sub-pixels.

Figure 4:
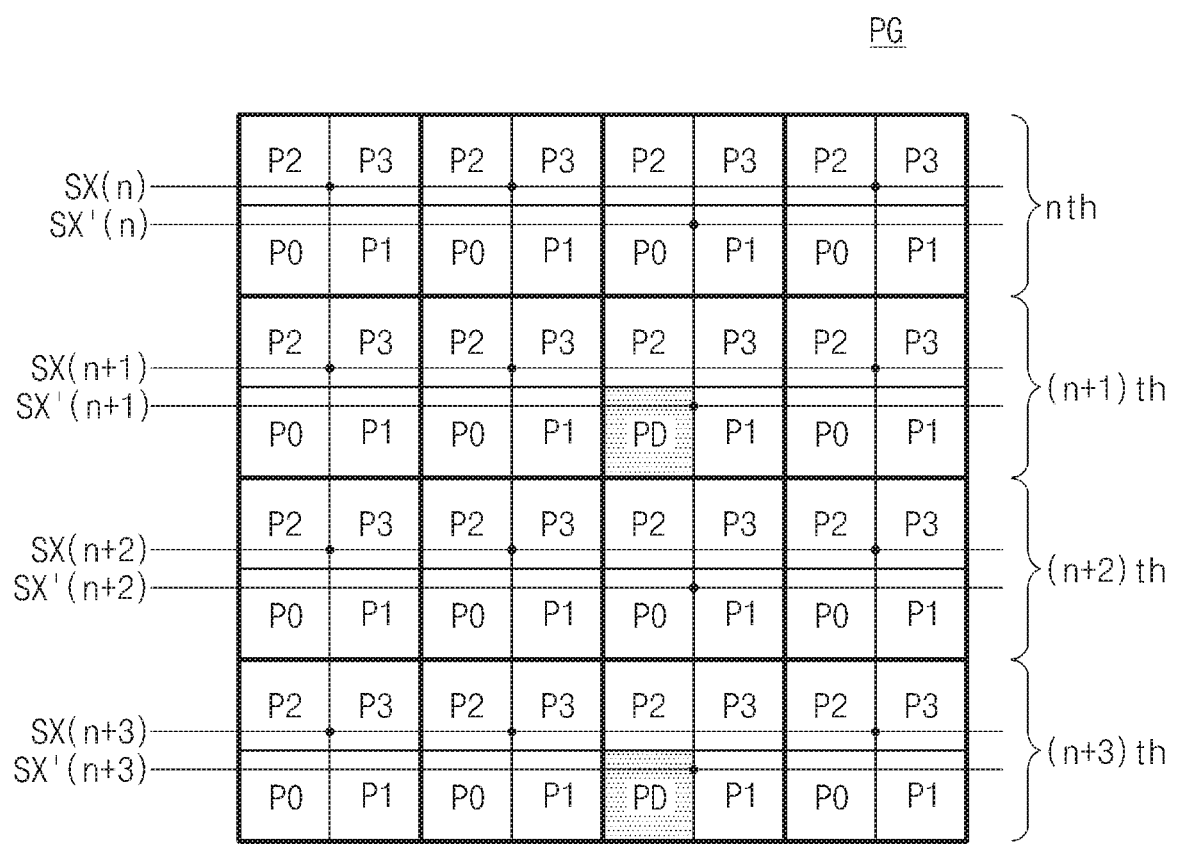

The second pixel PX2 may include a sub-pixel array of sub-pixels PD and P1-P3 arranged in a 2×2 matrix. Each of the sub-pixels PD, P1, P2, and P3 may be a color pixel to absorb light having a range of specific wavelengths. To this end, color filters may be disposed in light receiving directions of the respective sub-pixels P1~P3. For example, the color filters may include a red filter, a green filter, and a blue filter arranged in a Bayer pattern. Meanwhile, the sub-pixel PD may be a phase detection (PD) pixel that absorbs green-based light and performs autofocus based on phase detection. That is, the sub-pixel PD may be a half-shielded pixel to cover the left or right half of the light receiving region. In this case, the autofocus operation based on phase detection is as follows. An image signal processor (not shown) receiving the output signal OUT may detect a phase difference between a first image formed by sub-pixels covering the left half of the light receiving region and a second image formed by other sub-pixels covering the right half of the light receiving region, may calculate a movement distance of a lens based on the detected phase difference, and may adjust a position of the lens based on the calculation to acquire focused images (i.e., in-focus images). The number of PD pixels disposed in the second pixel PX2 and the arrangement relationship between the PD pixels and other sub-pixels disposed in the second pixel PX2 as shown in FIG. 4 are merely examples, the scope or spirit of the disclosed technology is not limited thereto, and it should be noted that a plurality of PD pixels may be used or PD pixels may also be disposed at other positions different from those of FIG. 4 as necessary.

Since the sub-pixel PD is used for autofocus, the sub-pixel PD may be considered a dead pixel in terms of a color image. In order to compensate for a damaged image caused by the dead pixel, the image signal processor (not shown) may compensate for the damaged image by estimating green pixel data corresponding to the position of the sub-pixel PD using adjacent or neighboring pixels surrounding the green pixel. Although the sub-pixel PD is arranged at the position of the green pixel from among the Bayer pattern of the second pixel PX2 for convenience of description and better understanding of the disclosed technology, the scope or spirit of the disclosed technology is not limited thereto, and it should be noted that the sub-pixel PD may also be arranged at other positions corresponding to other pixels other than the green pixel as necessary.

In the meantime, the second pixel PX2 including the sub-pixel PD may be arranged at a predefined position within the pixel array 110, the rate and positions of the second pixels PX2 from among total pixels may be arbitrarily determined within the range within which a color image acquired from the pixel array 110 is not deteriorated in quality or the range within which a normal autofocus operation is guaranteed. However, the second pixel PX2 including sub-pixels covering the left half of the light receiving region and the other second pixel PX2 including sub-pixels covering the right half of the light receiving region may be located as close to each other as possible. As a result, noise caused by a position difference encountered when a phase difference between images is detected can be reduced. Although FIG. 2 illustrates that the second pixels PX2 adjacent to each other are arranged in the same column on the basis of only one row interposed therebetween for convenience of description, the scope or spirit of the disclosed technology is not limited thereto.

In the drawings from FIG. 4, a method for driving pixels in accordance with one embodiment of the disclosed technology will hereinafter be described using the pixel group PG shown in FIG. 2 as an example.

Figure 3:
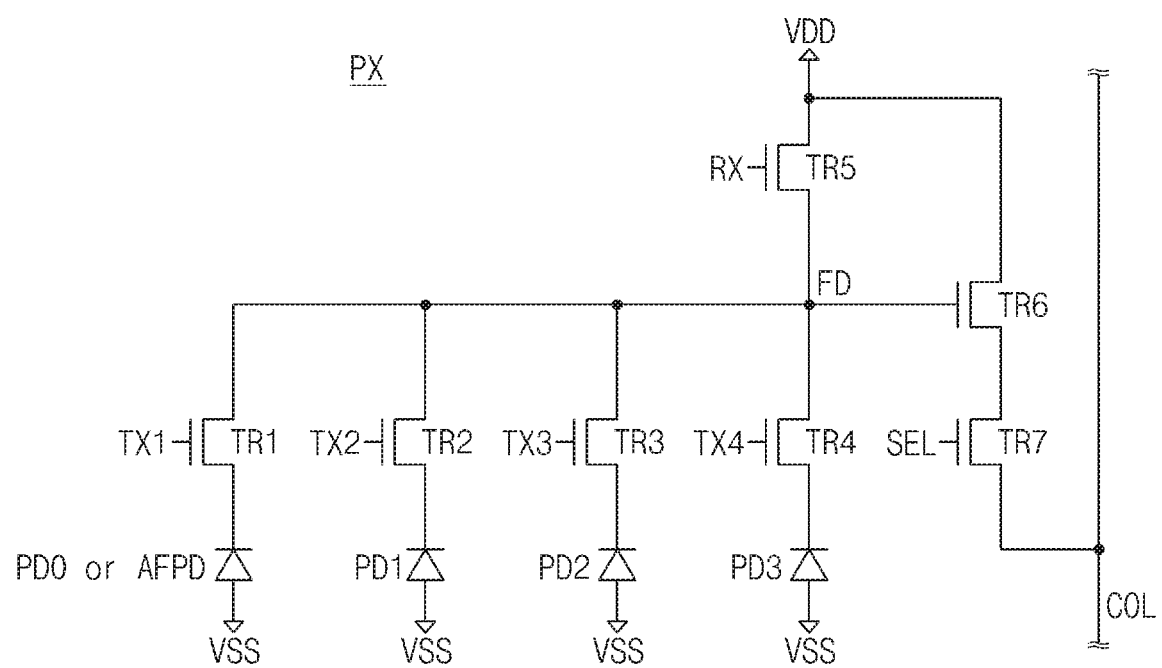
FIG. 3 is a detailed circuit diagram illustrating a first pixel or a second pixel shown in FIG. 2.

FIG. 3 is a detailed circuit diagram illustrating the first pixel or the second pixel shown in FIG. 2 in accordance with an embodiment of the disclosed technology.

Referring to FIG. 3, the pixel PX in accordance with the embodiment of the disclosed technology may denote the first pixel PX1 or the second pixel PX2 shown in FIG. 2.

The pixel PX may include first to fourth photoelectric conversion elements PD0 or AFPD, PD1, PD2, and PD3, first to fourth transmission transistors TR1~TR4, a reset transistor TR5, a drive transistor TR6, and a selection transistor TR7.

The first to fourth photoelectric conversion elements PD0 or AFPD, PD1, PD2, PD3 may respectively absorb incident light, and may accumulate photocharges corresponding to the amount of absorbed incident light. The first or fourth photoelectric conversion elements PD0 or AFPD, PD1, PD2, and PD3 may include a photodiode (PD), a phototransistor, a photogate, a pinned photodiode, and/or a combination thereof. For convenience of description, the first to fourth photoelectric conversion elements PD0 or AFPD, PD1, PD2, PD3 are exemplarily implemented as photodiodes as shown in FIG. 3. Photocharges accumulated in the first to fourth photoelectric conversion elements PD0 or AFPD, PD1, PD2, and PD3 may be transmitted to a floating diffusion region FD through the transmission transistors TR1, TR2, TR3, and R4, respectively. One end of each of the first to fourth photoelectric conversion elements PD0 or AFPD, PD1, PD2, and PD3 may be coupled to a source voltage VSS. In this case, the source voltage VSS may be a ground voltage.

Assuming that the pixel PX is the first pixel PX1, the first photoelectric conversion element may be denoted by 'PD0'. In this case, the first to fourth photoelectric conversion elements PD0, PD1, PD2, and PD3 may be respectively disposed at the positions of the sub-pixels P0, P1, P2, and P3 of the first pixel PX1. If the pixel PX is the second pixel PX2, the first photoelectric conversion element may be denoted by 'AFPD'. In this case, the first to fourth photoelectric conversion elements AFPD, PD1, PD2, and PD3 may be disposed at the positions of the sub-pixels PD, P1, P2, and P3 of the second pixel PX2.

The first to fourth transmission transistors TR1~TR4 may be respectively turned on according to transmission (Tx) signals TX1~TX4 respectively applied to gate terminals thereof, such that the first to fourth transmission transistors TR1~TR4 may respectively transmit photocharges accumulated in the first to fourth photoelectric conversion elements PD0 or AFPD, PD1, PD2, and PD3 to the floating diffusion region FD.

The reset transistor TR5 may be turned on according to a pixel reset signal RX applied to a gate terminal thereof, such that the reset transistor TR5 may reset the floating diffusion region FD to a power-supply voltage VDD.

The drive transistor TR6 exemplarily shown as a source follower amplifier may amplify the change in electrical potential of the floating diffusion region FD having received the photocharges accumulated in the first to fourth photoelectric conversion elements PD0 or AFPD, PD1, PD2, and PD3, and may transmit the amplified result to a selection transistor TR7.

The selection transistor TR7 may serve to select a pixel to be read on a row basis. The selection transistor TR7 may be turned on according to a row selection signal SEL applied to a gate terminal thereof, such that a signal corresponding to the change of FD electrical potential to be applied to a drain terminal (i.e., a source terminal of the drive transistor TR6) of the selection transistor TR7 may be output, as an output voltage, to a column line COL coupled to the source terminal of the selection transistor TR7.

While the pixel PX is selected by the row selection signal SEL, the pixel PX may operate as follows.

The reset transistor TR5 may be turned on such that a voltage of the floating diffusion region FD is reset to the power-supply voltage VDD and a voltage of the floating diffusion region FD may be output through the drive transistor TR6 and the selection transistor TR7, and the resultant signal that is output through the drive transistor TR6 and the selection transistor TR7 may be used as a reference signal of the sub-pixel P0 or PD. Thereafter, the first transmission transistor TR1 is turned on such that photocharges accumulated in the first photoelectric conversion element PD0 or AFPD are transmitted to the floating diffusion region FD, and a voltage of the floating diffusion region FD may be output through the drive transistor TR6 and the selection transistor TR7, and the resultant signal that is output through the drive transistor TR6 and the selection transistor TR7 may be used as an image signal of the sub-pixel P0 or PD.

Thereafter, the reset transistor TR5 may be turned on such that a voltage of the floating diffusion region FD is reset to the power-supply voltage VDD and a voltage of the floating diffusion region FD may be output through the drive transistor TR6 and the selection transistor TR7, and the resultant signal that is output through the drive transistor TR6 and the selection transistor TR7 may be used as a reference signal of the sub-pixel P1. Subsequently, the second transmission transistor TR2 may be turned on such that photocharges accumulated in the second photoelectric conversion element PD1 are transmitted to the floating diffusion region FD, and a voltage of the floating diffusion region FD may be output through the drive transistor TR6 and the selection transistor TR7, and the resultant signal that is output through the drive transistor TR6 and the selection transistor TR7 may be used as an image signal of the sub-pixel P1.

Thereafter, in the same manner as in the above-mentioned operations, a reference signal and an image signal for the sub-pixel P2 and a reference signal and an image signal for the last sub-pixel P3 may be sequentially generated and then output to the column line COL.

FIG. 4 is a structural diagram illustrating the pixel group PG shown in FIG. 2 and a line structure for supplying a row selection signal to the pixel group PG.

Referring to FIG. 4, the pixel group PG may be identical to the pixel group PG shown in FIG. 2, and a more detailed structure of the sub-pixels disposed in each pixel is shown FIG. 4. In other words, the first pixel PX1 may include 4 color pixels P0~P3, and the second pixel PX2 may include a single phase detection pixel PD and three color pixels P1~P3.

The pixel group PG may include four rows and four columns. The pixel group PG may include the plurality of rows ranging from the n-th row to the (n+3)-th row (where 'n' is an integer equal to or greater than 1).

The image sensor 100 may operate in a normal mode or in a binning mode. In this case, the normal mode may denote an operation mode in which only one row is accessed at the same time, and the binning mode may denote an operation mode in which several rows are accessed at the same time. Therefore, in the normal mode, a signal from pixels disposed in one selected row may be output to a single column line. In the binning mode, signals from pixels disposed in plural selected rows may be simultaneously output to a single column line. If the plural signals are simultaneously output to the single column line, a signal formed by addition of the plural signals may be transmitted to the CDS circuit 130. Whereas the binning mode has superior SNR (Signal to Noise Ratio) and higher frame rates as compared to the normal mode, the binning mode has lower resolution than the normal mode. Therefore, the image sensor 100 may select the normal mode or the binning mode as necessary, and may operate in the selected mode. In more detail, the image sensor 100 may allow the timing controller 170 to select any one of the normal mode and the binning mode according to a control signal received from an external part (e.g., the image signal processor), and may control the row decoder 120 according to the selected mode, such that the selected mode can be carried out.

For convenience of description and better understanding of the disclosed technology, it is assumed that two rows are simultaneously accessed in the binning mode. In other words, during the binning mode, the n-th row and the (n+1)-th row may be simultaneously accessed, such that a signal of pixels disposed in the n-th row and a signal of pixels disposed in the (n+1)-th row may be simultaneously output. In addition, in the binning mode, the (n+2)-th row and the (n+3)-th row are simultaneously accessed, such that a signal of pixels disposed in the (n+2)-th row and a signal of pixels disposed in the (n+3)-th row may be simultaneously output.

The row selection signal SEL to be applied to the pixel array 110 may include a first row selection signal SX and a second row selection signal SX'. In addition, the first row selection signal and the second row selection signal to be applied to the k-th row (where 'k' is an arbitrary positive integer) may be denoted by SX(k) and SX'(k), respectively.

Referring to FIG. 4, lines for respectively supplying the first row selection signal and the second row selection signal may be disposed in each row of the pixel group PG.

A detailed description of the n-th row is as follows. From among the pixels disposed in the n-th row, the remaining first pixels PX1 other than the first pixel PX1 disposed in the same column as the second pixel PX2 may receive the first row selection signal SX(n). From among the pixels disposed in the n-th row, the first pixel PX1 disposed in the same column as the second pixel PX2 may receive the second row selection signal SX'(n).

A detailed description of the (n+1)-th row is as follows. From among the pixels disposed in the (n+1)-th row, each of the first pixels PX1 may receive the first row selection signal SX(n+1). From among the pixels disposed in the (n+1)-th row, the second pixel PX2 may receive the second row selection signal SX'(n+1).

A detailed description of the (n+2)-th row is as follows. From among the pixels disposed in the (n+2)-th row, the remaining first pixels PX1 other than the first pixel PX1 disposed in the same column as the second pixel PX2 may receive the first row selection signal SX(n+2). From among the pixels disposed in the (n+2)-th row, the first pixel PX1 disposed in the same column as the second pixel PX2 may receive the second row selection signal SX'(n+2).

A detailed description of the (n+3)-th row is as follows. From among the pixels disposed in the (n+3)-th row, each of the first pixels PX1 may receive the first row selection signal SX(n+3). From among the pixels disposed in the (n+3)-th row, the second pixel PX2 may receive the second row selection signal SX'(n+3).

A method for supplying the row selection signals SX and SX' and the arrangement of the row selection lines may be defined as follows. In more detail, the second row selection signal SX' may be supplied not only to the second pixel PX2, but also to the first pixel PX1 that is accessed simultaneously with the second pixel PX2 in the binning mode and outputs a signal to the same column line, and the first row selection signal SX may be supplied to each of the remaining first pixels PX1 (other than the above-mentioned first pixel PX1) that are not accessed simultaneously with the second pixel PX2 in the binning mode or are not coupled to the same column line as the above-mentioned second pixel PX2. That is, the first row selection signal may be supplied to some portions of the first pixel PX1, and the second row selection signal may be supplied to some other portions of the remaining parts of the first pixel PX1.

Therefore, only the first row selection signal other than the second row selection signal may be supplied to a row in which the second pixel PX2 and the first pixel PX1 that are accessed simultaneously in the binning mode and output signals to the same column line are not disposed, and the second row selection signal may not be supplied to the above-mentioned row. In this case, although the line for supplying the second row selection signal is not arranged in that row, the scope or spirit of the disclosed technology is not limited thereto, and it should be noted that a line for supplying the second row selection signal may be arranged in that row according to the degree of fabrication facilitation as necessary.

Figure 5:
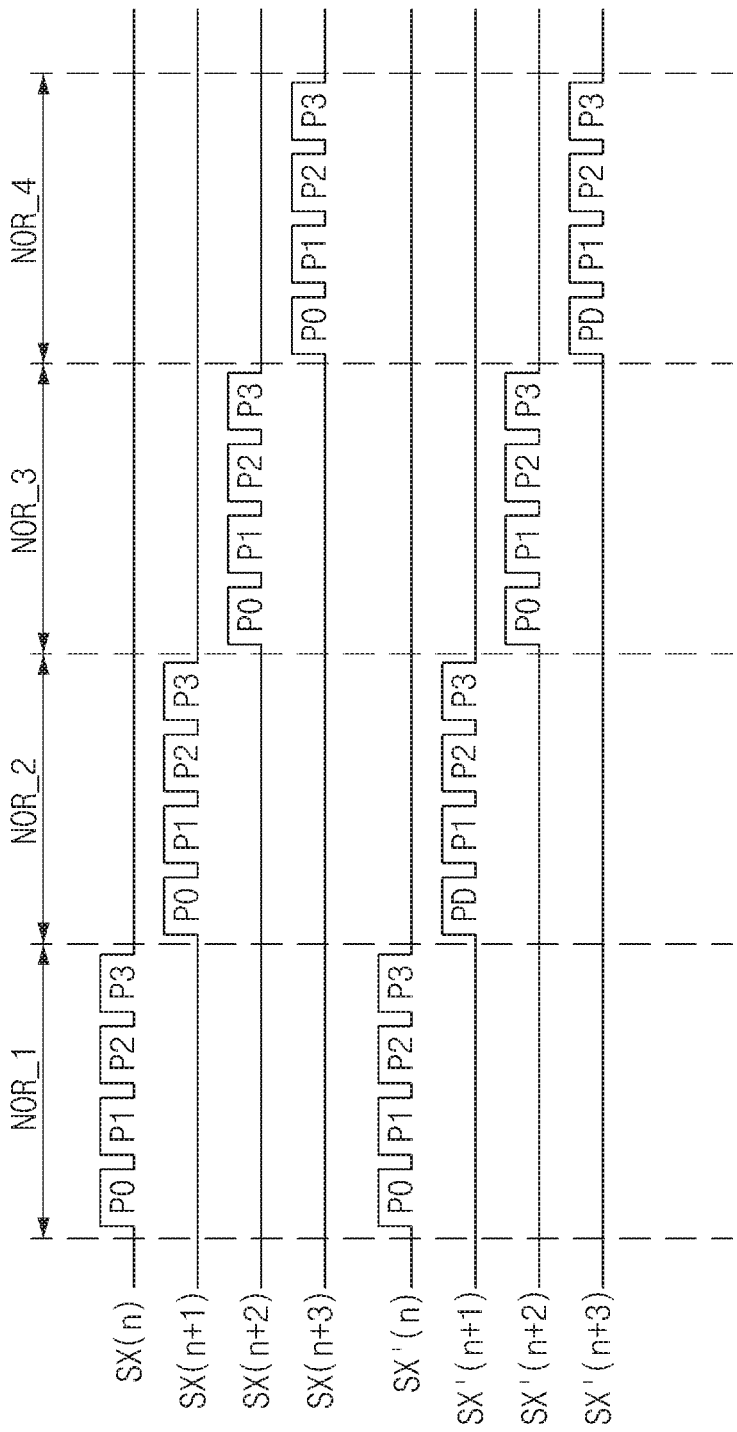
FIG. 5 is a timing diagram illustrating a method for driving a pixel group PG in a normal mode in accordance with an embodiment of the disclosed technology.

FIG. 5 is a timing diagram illustrating a method for driving the pixel group PG in the normal mode in accordance with an embodiment of the disclosed technology.

Referring to FIG. 5, a drive section of the pixel group PG in the normal mode may be classified into first to fourth normal drive sections NOR_1~NOR_4.

The first to fourth normal drive sections NOR_1~NOR_4 may be considered sections for respectively reading pixel signals of the respective rows ranging from the n-th row to the (n+3)-th row. In addition, in each of the first to fourth normal drive sections NOR_1~NOR_4, pixel signals for respective sub-pixels P0 or PD and P1~P3 disposed in the first pixel PX1 or the second pixel PX2 may be sequentially generated and output.

Referring to FIG. 5, in each of the first to fourth normal drive sections NOR_1~NOR_4, respective rows ranging from the n-th row to the (n+3)-th row may be sequentially accessed. In this case, the plurality of rows may not be simultaneously accessed and only one row may be accessed in each of the first to fourth normal drive sections NOR_1~NOR_4.

In order to access the n-th row in the first normal drive section NOR_1, each of the first row selection signal SX(n) and the second row selection signal SX'(n) may have high-level sections. In each of the high-level sections, pixel signals of the sub-pixels P0~P3 of each of the first pixels PX1 disposed in the n-th row may be sequentially output. To this end, transmission transistors of the sub-pixels P0~P3 may be sequentially turned on, and the reset transistor for resetting the floating diffusion region FD may be turned on. A detailed description related to controlling the transmission transistors and the reset transistor for generating pixel signals of the corresponding sub-pixels will herein be omitted for convenience of description. In this case, a high level may denote a logical high level, and the corresponding selection transistor may be turned on in the high-level section.

In order to access the (n+1)-th row in the second normal drive section NOR_2, each of the first row selection signal SX(n+1) and the second row selection signal SX'(n+1) may have high-level sections. In each of the high-level sections, pixel signals of the sub-pixels P0 or PD and P0~P3 of each of the second pixel PX2 and the first pixels PX1 disposed in the (n+1)-th row may be sequentially output.

Likewise, even in the third normal drive section NOR_3 and the fourth normal drive section NOR_4, pixel signals of pixels disposed in the (n+2)-th row may be sequentially output in the third normal drive section NOR_3, and pixel signals of pixels disposed in the (n+3)-th row may be sequentially output in the fourth normal drive section NOR_4.

Figure 6:
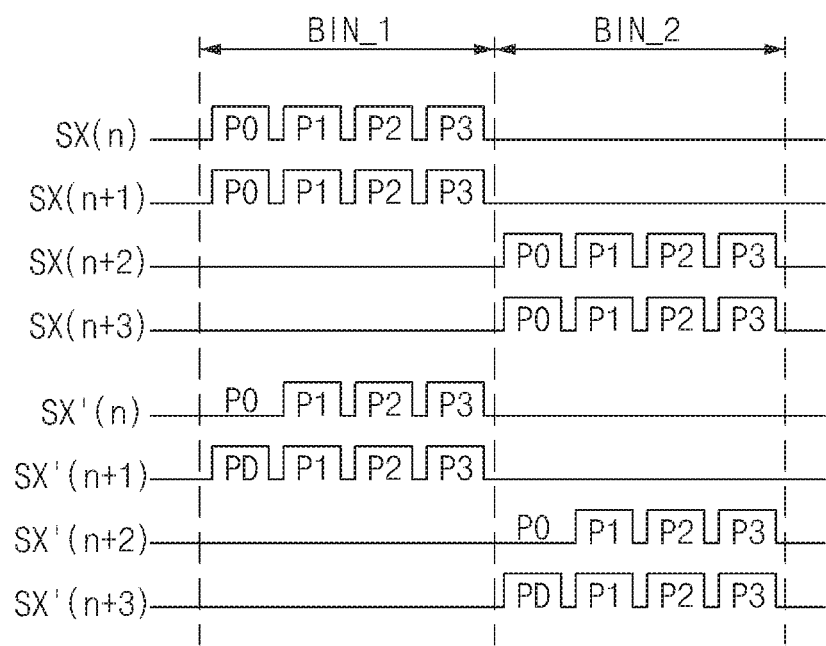
FIG. 6 is a timing diagram illustrating a method for driving a pixel group PG in a binning mode in accordance with an embodiment of the disclosed technology.

FIG. 6 is a timing diagram illustrating a method for driving the pixel group PG in the binning mode in accordance with an embodiment of the disclosed technology.

Referring to FIG. 6, the drive section of the pixel group PG in the binning mode may be classified into a first binning drive section BIN_1 and a second binning drive section BIN_2.

The first binning drive section BIN_1 may be a time section in which pixel signals for the n-th row and pixel signals for the (n+1)-th row are simultaneously read out. If both one pixel disposed in the n-th row coupled to a single column line and the other pixel disposed in the (n+1)-th row coupled to the single column line are the first pixels PX1, pixel signals of the sub-pixels disposed in the two pixels may be simultaneously output to the column line in all the sections of the first binning drive section BIN_1. However, if the pixel disposed in the n-th row coupled to a single column line and the other pixel disposed in the (n+1)-th row coupled to the single column line are respectively the first pixel PX1 and the second pixel PX2, the pixel signal of the sub-pixel P0 disposed in the first pixel PX1 may be controlled not to be output to the column line in a specific section of the first binning drive section BIN_1.

That is, pixel signals of the sub-pixels P0~P3 disposed in each first pixel PX1, which receives the first row selection signals SX(n) and SX(n+1) in the first binning drive section BIN_1, may be simultaneously output to the column line. However, whereas pixel signals of the sub-pixels PD and P1-P3 disposed in the second pixel PX2 receiving the second row selection signal SX'(n+1) are sequentially output to the column line, pixel signals of the sub-pixel P0 disposed in the first pixel PX1 receiving the second row selection signal SX'(n) may not be output to the column line as necessary. To this end, the second row selection signal SX'(n) may have a low level in a specific section (i.e., a time section in which a signal of the color pixel P0 to be accessed simultaneously with the phase detection pixel PD disposed in the second pixel PX2 needs to be output) in which the pixel signal of the sub-pixel P0 disposed in the first pixel PX1 needs to be output.

The second binning drive section BIN_2 may be a time section in which a pixel signal of the (n+2)-th row of the pixel group PG and a pixel signal of the (n+3)-th row of the pixel group PG are simultaneously read. If the pixel disposed in the (n+2)-th row coupled to a single column line and the pixel disposed in the (n+3)-th row coupled to the single column line are the first pixels PX1, pixel signals of the sub-pixels disposed in the two pixels may be controlled to be simultaneously output to the column line in all the sections of the second binning drive section BIN_2. However, if the pixel disposed in the (n+2)-th row coupled to a single column line and the pixel disposed in the (n+3)-th row coupled to the single column line are respectively the first pixel PX1 and the second pixel PX2, the pixel signal of the sub-pixel P0 disposed in the first pixel PX1 may be controlled not to be output to the column line in a specific section of the second binning drive section BIN_2.

That is, pixel signals of the sub-pixels P0~P3 disposed in each first pixel PX1 that receives the first row selection signals SX(n+2) and SX(n+3) in the second binning drive section BIN_1 may be simultaneously output to the column line. However, whereas pixel signals of the sub-pixels PD and P1~P3 disposed in the second pixel PX2 receiving the second row selection signal SX'(n+3) are sequentially output to the column line, pixel signals of the sub-pixel P0 disposed in the first pixel PX1 receiving the second row selection signal SX'(n+2) may not be output to the column line as necessary. To this end, the second row selection signal SX'(n+2) may have a low level in a specific section in which the pixel signal of the sub-pixel P0 disposed in the first pixel PX1 needs to be output.

There is no problem in an exemplary case in which two sub-pixels where pixel signals are summed in the binning mode are composed of the same kinds of sub-pixels (e.g., red pixels). In contrast, in another exemplary case in which two sub-pixels where pixel signals are summed in the binning mode are composed of different kinds of sub-pixels (e.g., a green pixel and a phase detection pixel PD), the pixel signal of the phase detection pixel PD and the pixel signal of the green pixel are summed, such that it is impossible to acquire desired information needed for such phase detection. Therefore, in association with the driving method of the embodiment of the disclosed technology, the pixel signal of the sub-pixel P0 indicating the green pixel that is capable of being output simultaneously with the other sub-pixel PD indicating the phase detection pixel PD in the binning mode may be controlled not to be output to the column line. As a result, it is possible to acquire image data of the phase detection pixel PD for auto-focusing even in the binning mode, such that the autofocus function can be retained. In addition, a dead pixel in terms of the color image may unavoidably occur at a specific position where only the pixel signal of the sub-pixel PD acting as the phase detection pixel PD is output. In order to compensate for a damaged image caused by the dead pixel, the image signal processor (not shown) may estimate green pixel data corresponding to the specific position using peripheral pixels (e.g., green pixels adjacent to one another in up, down, right and left directions). The image sensor and the image signal processor (not shown) for processing image data generated from the image sensor may be integrated into one chip or may be implemented as different chips. Alternatively, the image sensor and the image signal processor may also simultaneously construct an image processing system.

Figure 7:
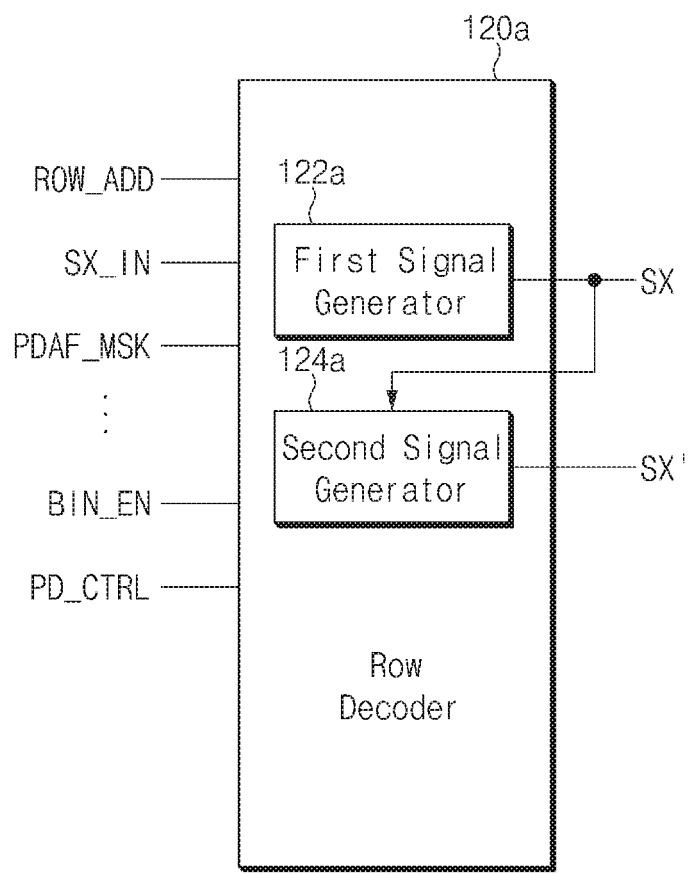
FIG. 7 is a schematic diagram illustrating a row decoder in accordance with an embodiment of the disclosed technology.

FIG. 7 is a schematic diagram illustrating a row decoder 120a in accordance with an embodiment of the disclosed technology.

Referring to FIG. 7, the row decoder 120a may correspond to one example of the row decoder 120 shown in FIG. 1. The row decoder 120a may receive various signals from the timing controller 170, and may generate the first row selection signal SX and the second row selection signal SX' so as to select at least one row from the pixel array 110 based on the received signals.

Signals received by the row decoder 120a from the timing controller 170 may include a row address signal ROW_ADD, a row selection input signal SX_IN, a pixel masking signal PDAF_MSK, a binning enable signal BIN_EN, and a pixel position signal PD_CTRL. Although the embodiment of the disclosed technology has been disclosed centering around signals related to creation of the row selection signal SEL for convenience of description, it should be noted that the row decoder 120a may also receive other signals to be used as basic signals needed for pixel driving from the timing controller 170 without departing from the scope or spirit of the disclosed technology.

The row address signal ROW_ADD may denote address information of at least one row to be selected. For example, each of the plurality of rows disposed in the pixel array 110 may correspond to a predetermined address, and at least one row to be decided by the row address signal ROW_ADD may be selected. In accordance with the embodiment, although the row address signal ROW_ADD <0:N> (where 'N' is an integer equal to or higher than 1) may be data having (N+1) bits, the scope or spirit of the disclosed technology is not limited thereto.

The row selection input signal SX_IN may provide the selected pixels with specific time points at which the selected pixels simultaneously output their own pixel signals.

The pixel masking signal PDAF_MSK may prevent a specific sub-pixel (e.g., a color pixel that is coupled to the same column line as the phase detection pixel PD and is accessed simultaneously with the phase detection pixel PD in the binning mode) from outputting a signal to the column line.

The binning enable signal BIN_EN may be a signal indicating whether the binning mode is activated. For example, if the binning enable signal BIN_EN is at a low level, this means that the normal mode is activated. If the binning enable signal BIN_EN is at a high level, this means that the binning mode is activated.

The pixel position signal PD_CTRL may be a signal dependent upon the position of the phase detection pixel PD. That is, the pixel position signal PD_CTRL may have a variable value that is changed according to the positional relationship between the phase detection pixel PD and the color pixel that are simultaneously accessed in the binning mode. For example, if the positional relationship between the first pixel PX1 and the second pixel PX2 that are simultaneously accessed in the binning mode indicates that the first pixel PX1 is disposed over the second pixel PX2 in a plane as shown in FIG. 4, the pixel position signal PD_CTRL may have a low level. In contrast, if the positional relationship between the first pixel PX1 and the second pixel PX2, which are simultaneously accessed in the binning mode, indicates that the first pixel PX1 is disposed below the second pixel PX2 in a plane, the pixel position signal PD_CTRL may have a high level.

The row decoder 120a may include a first signal generator 122a for generating the first row selection signal SX and a second signal generator 124a for generating the second row selection signal SX'.

The first signal generator 122a may generate the first row selection signal SX based on the row address signal ROW_ADD and the row selection input signal SX_IN. The first row selection signal SX may transmit the row selection input signal SX_IN to at least one row selected by the row address signal ROW_ADD. For example, if the row address signal ROW_ADD indicates the m-th row (where m is an arbitrary positive number), the first row selection signal SX(m) to be supplied to the m-th row may have the same waveform as the row selection input signal SX_IN, and the first row selection signal to be supplied to the remaining rows other than the m-th row may be maintained at a constant level (e.g., a low level).

The second signal generator 124a may perform conversion of the first row selection signal SX based on the pixel masking signal PDAF_MSK, the binning enable signal BIN_EN, and the pixel position signal PD_CTRL, and may thus generate the second row selection signal SX'. Although the first row selection signal SX and the second row selection signal SX' may have the same waveform in the normal mode, the second row selection signal SX' for use in the binning mode may have a different waveform through which a color pixel that is coupled to the same column line as the phase detection pixel PD and is accessed simultaneously with the phase detection pixel PD is prevented from outputting a signal to the column line.

Figure 8:
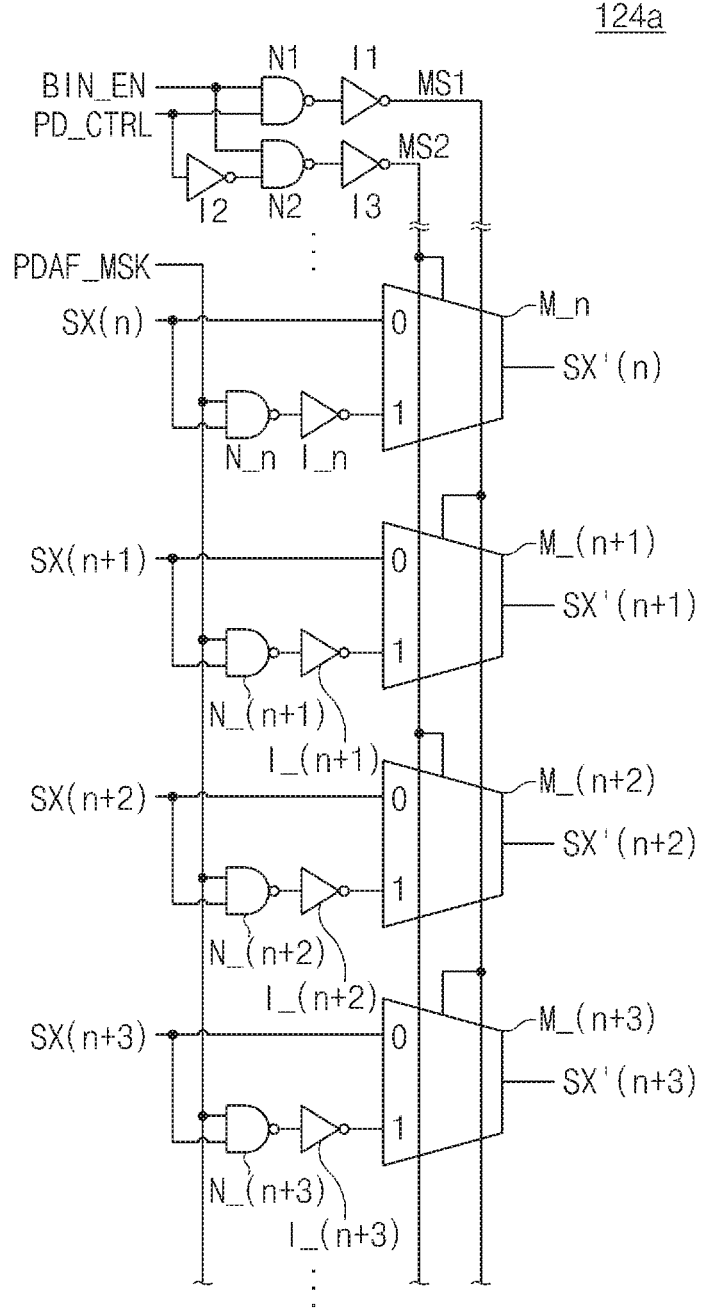
FIG. 8 is a circuit diagram illustrating one example of a second signal generator shown in FIG. 7 in accordance with an embodiment of the disclosed technology.

FIG. 8 is a circuit diagram illustrating the second signal generator 124a shown in FIG. 7 in accordance with an embodiment of the disclosed technology.

Referring to FIG. 8, although the second signal generator 124a includes constituent elements needed to generate the second row selection signals SX'(n)~SX'(n+3) to be supplied to the pixel group PG, the scope or spirit of the disclosed technology is not limited thereto, and it should be noted that the second signal generator 124a may further include other constituent elements needed to generate the second row selection signals to be supplied to other rows different from those of the pixel group PG as necessary.

The second signal generator 124a may include a plurality of NAND gates, a plurality of inverters, and a plurality of multiplexers.

The first NAND gate N1 may output the result of a NAND operation between the binning enable signal BIN_EN and the pixel position signal PD_CTRL to the first inverter I1. The first inverter I1 may output a first multiplexer (MUX) selection signal MS1 by inverting an input signal thereof. That is, the first MUX selection signal MS1 may correspond to the result of an AND operation between the binning enable signal BIN_EN and the pixel position signal PD_CTRL.

The second inverter I2 may invert the pixel position signal PD_CTRL, and may thus output the inverted pixel position signal PD_CTRL. The second NAND gate N2 may output the result of a NAND operation between the binning enable signal BIN_EN and the output signal of the second inverter I2 to the third inverter I3. The third inverter I3 may invert the input signal, and may thus output a second MUX selection signal MS2. That is, the second MUX selection signal MS2 may correspond to the result of an AND operation between the binning enable signal BIN_EN and the inverted pixel position signal PD_CTRL.

The first and second NAND gates N1 and N2 and the first to third inverters I1~I3 will hereinafter be generically referred to as an output selection circuit.

In this case, the first MUX selection signal MS1 indicating the output signal of the first inverter I1 may be transmitted to a selection terminal of second and fourth multiplexers M_(n+1) and M_(n+3) that respectively supply the second row selection signals SX'(n+1) and SX'(n+3) to the second pixel PX2. In addition, the second MUX selection signal MS2 indicating the output signal of the third inverter I3 may be transmitted to a selection terminal of first and third multiplexers M_n and M_(n+2) that respectively supply the second row selection signals SX'(n) and SX'(n+2) to the first pixel PX1 that is coupled to the same column line as the second pixel PX2 in the binning mode and is accessed simultaneously with the second pixel PX2 in the binning mode.

Each of the first to fourth multiplexers M_n~M_(n+3) may output an input signal to be received at an input terminal "1" or "0" according to the first or second MUX selection signal MS1 or MS2 to be supplied to the selection terminal. In other words, if the first or second MUX selection signal MS1 or MS2 is at a high level, the corresponding multiplexer may allow an input signal received at the input terminal "1" to be output as the row selection signal. In addition, if the first or second MUX selection signal MS1 or MS2 is at a low level, the corresponding multiplexer may allow an input signal received at the input terminal "0" to be output as the row selection signal.

The first row selection signal SX(n) may be input to the input terminal "0" of the first multiplexer M_n, the first row selection signal SX(n+1) may be input to the input terminal "0" of the second multiplexer M_(n+1), the first row selection signal SX(n+2) may be input to the input terminal "0" of the third multiplexer M_(n+2), and the first row selection signal SX(n+3) may be input to the input terminal "0" of the fourth multiplexer M_(n+3).

The result of an AND operation between the first row selection signal SX(n) and the pixel masking signal PDAF_MSK may be input to the input terminal "1" of the first multiplexer M_n. The result of an AND operation between the first row selection signal SX(n+1) and the pixel masking signal PDAF_MSK may be input to the input terminal "1" of the second multiplexer M_(n+1). The result of an AND operation between the first row selection signal SX(n+2) and the pixel masking signal PDAF_MSK may be input to the input terminal "1" of the third multiplexer M_(n+2). The result of an AND operation between the first row selection signal SX(n+3) and the pixel masking signal PDAF_MSK may be input to the input terminal "1" of the fourth multiplexer M_(n+3). To this end, a NAND gate N_n for receiving the first row selection signal SX(n) and the pixel masking signal PDAF_MSK and an inverter I_n for inverting the output signal of the NAND gate N_n may be coupled in series to the input terminal "1" of the first multiplexer M_n. A NAND gate N_(n+1) for receiving the first row selection signal SX(n+1) and the pixel masking signal PDAF_MSK and an inverter I_(n+1) for inverting the output signal of the NAND gate N_(n+1) may be coupled in series to the input terminal "1" of the second multiplexer M_(n+1). A NAND gate N_(n+2) for receiving the first row selection signal SX(n+2) and the pixel masking signal PDAF_MSK and an inverter I_(n+2) for inverting the output signal of the NAND gate N_(n+2) may be coupled in series to the input terminal "1" of the third multiplexer M_(n+2). A NAND gate N_(n+3) for receiving the first row selection signal SX(n+3) and the pixel masking signal PDAF_MSK and an inverter I_(n+3) for inverting the output signal of the NAND gate N_(n+3) may be coupled in series to the input terminal "1" of the fourth multiplexer M_(n+3).

If the binning enable signal BIN_EN is at a low level (i.e., a normal mode), each of the first MUX selection signal MS1 and the second MUX selection signal MS2 corresponding to the output signal of the output selection circuit is at a low level. Therefore, the first multiplexer M_n may output the first row selection signal SX(n) received at the input terminal "0" as the second row selection signal SX'(n) without change. The second multiplexer M_(n+1) may output the first row selection signal SX(n+1) received at the input terminal "0" as the second row selection signal SX'(n+1) without change. The third multiplexer M_(n+2) may output the first row selection signal SX(n+2) received at the input terminal "0" as the third row selection signal SX'(n+2) without change. The fourth multiplexer M_(n+3) may output the first row selection signal SX(n+3) received at the input terminal "0" as the fourth row selection signal SX'(n+3) without change. That is, during the normal mode, the second row selection signals SX'(n), SX'(n+1), SX'(n+2), and SX'(n+3) may respectively have the same waveform as the first row selection signals SX(n), SX(n+1), SX(n+2), and SX(n+3).

If the binning enable signal BIN_EN is at a high level (i.e., a binning mode), the first MUX selection signal MS1 and the second MUX selection signal MS2 corresponding to the output signals of the output selection circuit may have different levels according to the pixel position signal PD_CTRL. If the first pixel PX1 and the second pixel PX2 have the same positional relationship as in FIG. 4, the pixel position signal PD_CTRL may have a low level. In this case, during the binning mode, the first MUX selection signal MS1 and the second MUX selection signal MS2 may have a low level and a high level, respectively. If the first pixel PX1 and the second pixel PX2 have another positional relationship opposite to the above-mentioned positional relationship, it should be noted that the pixel position signal PD_CTRL may also have a high level without departing from the scope or spirit of the disclosed technology.

Therefore, the second multiplexer M_(n+1) that receives the first MUX selection signal MS1 through a selection terminal thereof may output the first row selection signal SX(n+1) as the second row selection signal SX'(n+1) without change. The fourth multiplexer M_(n+3) that receives the first MUX selection signal MS1 through a selection terminal thereof may output the first row selection signal SX(n+3) as the second row selection signal SX'(n+3) without change. In the meantime, the first multiplexer M_(n) that receives the second MUX selection signal MS2 through a selection terminal thereof may output the result of an AND operation between the first row selection signal SX(n) and the pixel masking signal PDAF_MSK as the second row selection signal SX'(n). The third multiplexer M_(n+2) that receives the second MUX selection signal MS2 through a selection terminal thereof may output the result of an AND operation between the first row selection signal SX(n+2) and the pixel masking signal PDAF_MSK as the second row selection signal SX'(n+2).

In this case, the pixel masking signal PDAF_MSK may be at a low level only in a time section in which there is a need to output the pixel signal of the sub-pixel P0 disposed in the first pixel PX1 that is coupled to the same column line as the second pixel PX2 and is accessed simultaneously with the second pixel PX2 in the binning mode, or only in the other time section in which the pixel signal of the phase detection pixel PD of the second pixel PX2 is output.

Figure 9:
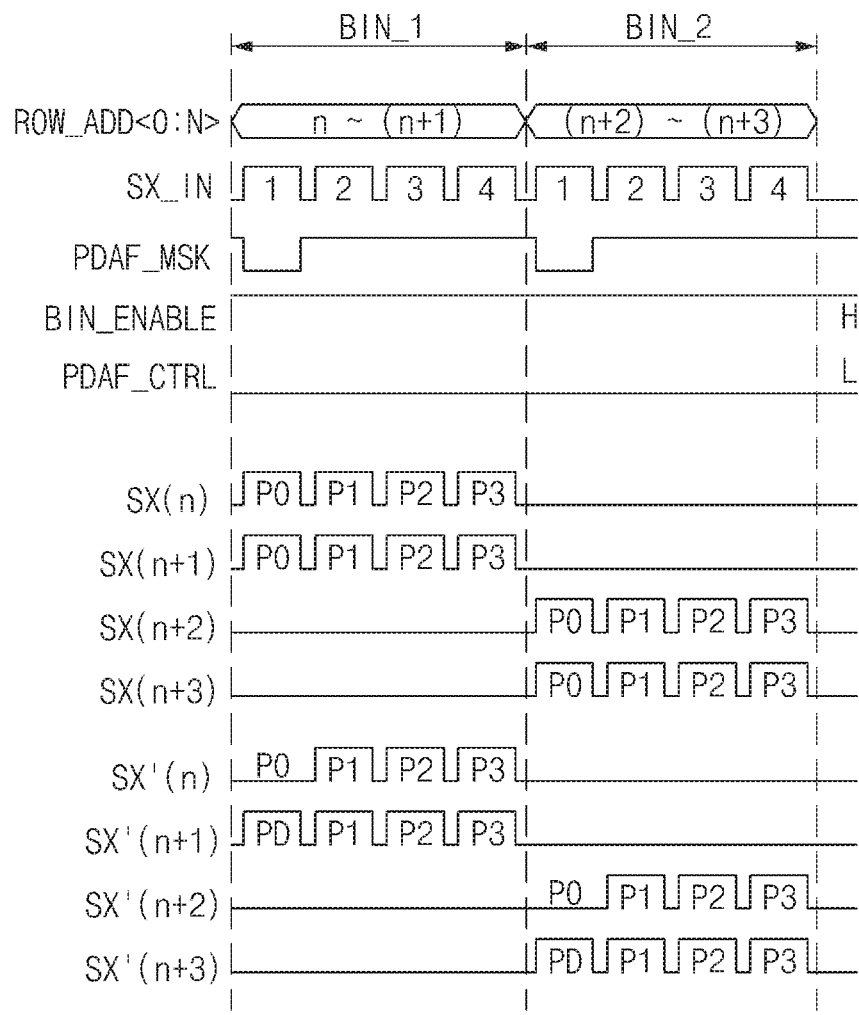
FIG. 9 is a timing diagram illustrating operations of a second signal generator shown in FIG. 8 in accordance with an embodiment of the disclosed technology.

FIG. 9 is a timing diagram illustrating operations of the second signal generator 124a shown in FIG. 8 in accordance with an embodiment of the disclosed technology.

Referring to FIG. 9, the first binning drive section BIN_1 may correspond to a time section in which the n-th row and the (n+1)-th row are simultaneously accessed. In addition, the second binning drive section BIN_2 may correspond to a time section in which the (n+2)-th row and the (n+3)-th row are simultaneously accessed. To this end, the row address signal ROW_ADD may include information of the n-th row and information of the (n+1)-th row during the first binning drive section BIN_1, and may include information of the (n+2)-th row and information of the (n+3)-th row during the second binning drive section BIN_2.

The row selection input signal SX_IN may provide a time point at which the respective sub-pixels corresponding to the first to fourth positions of each of the first pixel PX1 and the second pixel PX2 can simultaneously generate and output the pixel signals. In this case, the first to fourth positions may denote the position of the sub-pixel PD or P0, the position of the sub-pixel P1, the position of the sub-pixel P2, and the position of the sub-pixel P3, respectively.

The pixel masking signal PDAF_MSK may have a low level only in a specific section of the sub-pixel corresponding to the first position in the row selection input signal SX_IN, and may have a high level in the remaining sections other than the specific section in the row selection input signal SX_IN.

In addition, since a current mode is the binning mode, the binning enable signal BIN_EN may have a high level, and the pixel position signal PD_CTRL may have a low level according to the positional relationship of the pixels shown in FIG. 4.

As can be seen from the timing diagram of FIG. 9, the first signal generator 122a of the row decoder 120a may generate first row selection signals SX(n) and SX(n+1) in the first binning drive section BIN_1, such that pixel signals of the sub-pixels P0~P3 of the first pixel PX1 receiving the first row selection signals SX(n) and SX(n+1) can be sequentially output to the corresponding column line during the first binning drive section BIN_1. Thereafter, the first signal generator 122a of the row decoder 120a may generate first row selection signals SX(n+2) and SX(n+3) in the second binning drive section BIN_2, such that pixel signals of the sub-pixels P0~P3 of the first pixel PX1 receiving the first row selection signals SX(n+2) and SX(n+3) can be sequentially output to the corresponding column line during the second binning drive section BIN_2.

In addition, the second signal generator 124a of the row decoder 120a may generate the second row selection signal SX'(n+1) in the first binning drive section BIN_1, such that pixel signals of the sub-pixels PD and P1~P3 of the second pixel PX2 receiving the second row selection signal SX'(n+1) can be sequentially output to the corresponding column line during the first binning drive section BIN_1. At the same time, the second signal generator 124a of the row decoder 120a may generate the second row selection signal SX'(n) in the first binning drive section BIN_1, such that pixel signals of the sub-pixels P1~P3 other than the sub-pixel P0 corresponding to the first position of the first pixel PX1 can be sequentially output to the corresponding column line during the first binning drive section BIN_1. As a result, the pixel signal of the sub-pixel PD of the second pixel PX2 may be output to the column line without interference with other signals, such that the resultant output signal may be used to perform autofocus.

Likewise, the second signal generator 124a of the row decoder 120a may generate the second row selection signal SX'(n+3) in the second binning drive section BIN_2, such that pixel signals of the sub-pixels PD and P1~P3 of the second pixel PX2 receiving the second row selection signal SX'(n+3) can be sequentially output to the corresponding column line during the second binning drive section BIN_2. At the same time, the second signal generator 124a of the row decoder 120a may generate the second row selection signal SX'(n+2) in the second binning drive section BIN_2, such that pixel signals of the sub-pixels P1-P3 other than the sub-pixel P0 corresponding to the first position of the first pixel PX1 receiving the second row selection signal SX'(n+2) can be sequentially output to the corresponding column line during the second binning drive section BIN_2. As a result, the pixel signal of the sub-pixel PD of the second pixel PX2 may be output to the column line without interference with other signals, such that the resultant output signal may be used to perform autofocus.

Figure 10:
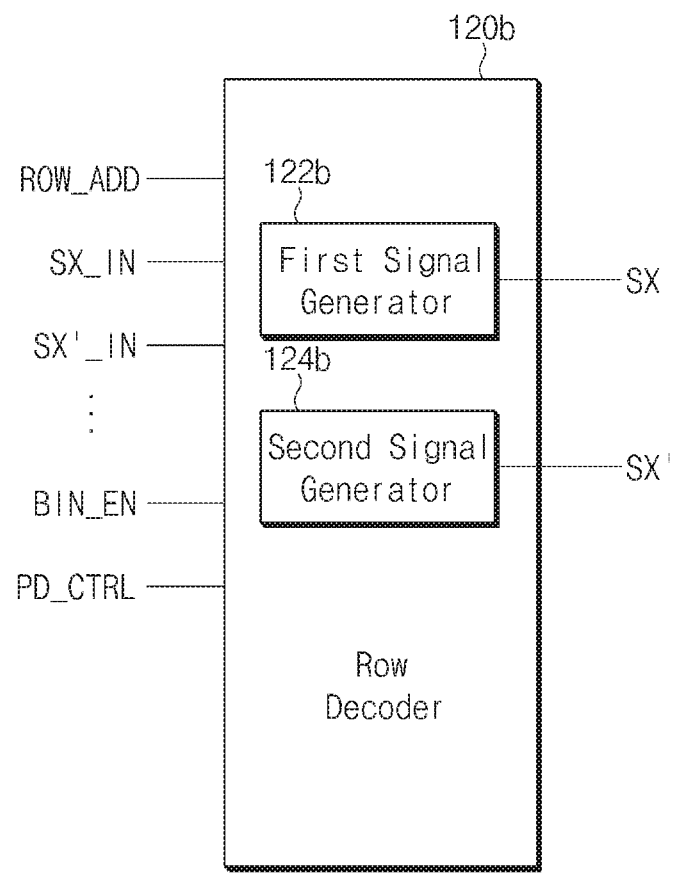
FIG. 10 is a schematic diagram illustrating one example of a row decoder in accordance with an embodiment of the disclosed technology.

FIG. 10 is a schematic diagram illustrating a row decoder 120b in accordance with an embodiment of the disclosed technology.

Referring to FIG. 10, the row decoder 120b may correspond to another embodiment of the row decoder 120 shown in FIG. 1. The row decoder 120b may receive various signals from the timing controller 170, and may generate the first row selection signal SX and the second row selection signal SX' for selecting at least one row of the pixel array 110 based on the received signals.

Signals received by the row decoder 120b from the timing controller 170 may include a row address signal ROW_ADD, a first two selection input signal SX_IN, a second row selection input signal SX'_IN, a binning enable signal BIN_EN, and a pixel position signal PD_CTRL. Although the embodiment of the disclosed technology has been disclosed centering around signals related to creation of the row selection signal SEL for convenience of description, it should be noted that the row decoder 120b may also receive other signals to be used as basic signals needed for pixel driving from the timing controller 170 without departing from the scope or spirit of the disclosed technology.

The row address signal ROW_ADD may denote address information of at least one row to be selected. For example, each of the plurality of rows disposed in the pixel array 110 may correspond to a predetermined address, and at least one row to be decided by the row address signal ROW_ADD may be selected.

The first row selection input signal SX_IN may provide the selected pixels with specific time points at which the selected pixels simultaneously output their own pixel signals. The first row selection input signal SX_IN shown in FIG. 10 may be substantially identical to the row selection input signal SX_IN shown in FIG. 7.

The second row selection input signal SX'_IN may provide a specific time point at which a specific sub-pixel (e.g., the color pixel that is coupled to the same column line as the phase detection pixel PD in the binning mode and is accessed simultaneously with the phase detection pixel PD in the binning mode) is prevented from outputting a signal to the column line. In accordance with the embodiment of the disclosed technology, the second row selection input signal SX'_IN may have the same waveform as the first row selection input signal SX_IN in the remaining time sections other than a low-level section during which the pixel signal of a specific sub-pixel would be generated and output.

The binning enable signal BIN_EN may indicate whether the binning mode is activated. For example, if the binning enable signal BIN_EN is at a low level, this means that the normal mode is activated. If the binning enable signal BIN_EN is at a high level, this means that the binning mode is activated.

The pixel position signal PD_CTRL may be a signal dependent upon the position of the phase detection pixel PD. That is, the pixel position signal PD_CTRL may have a variable value that is changed according to the positional relationship between the phase detection pixel PD and the color pixel that are simultaneously accessed in the binning mode. For example, if the positional relationship between the first pixel PX1 and the second pixel PX2 that are simultaneously accessed in the binning mode indicates that the first pixel PX1 is disposed over the second pixel PX2 in a plane as shown in FIG. 4, the pixel position signal PD_CTRL may have a low level. In contrast, if the positional relationship between the first pixel PX1 and the second pixel PX2 that are simultaneously accessed in the binning mode indicates that the first pixel PX1 is disposed below the second pixel PX2 in a plane, the pixel position signal PD_CTRL may have a high level.

The row decoder 120b may include a first signal generator 122b for generating the first row selection signal SX and a second signal generator 124b for generating the second row selection signal SX'.

The first signal generator 122b may generate the first row selection signal SX based on the row address signal ROW_ADD and the row selection input signal SX_IN. The first row selection signal SX may transmit the first row selection input signal SX_IN to at least one row selected by the row address signal ROW_ADD. For example, if the row address signal ROW_ADD indicates the m-th row, the first row selection signal SX(m) to be supplied to the m-th row may have the same waveform as the first row selection input signal SX_IN, and the first row selection signal to be supplied to the remaining rows other than the m-th row may be maintained at a constant level (e.g., a low level).

The second signal generator 124b may select any one of a conversion signal of the first row selection input signal SX_IN and a conversion signal of the second row selection input signal SX'_IN based on the binning enable signal BIN_EN and the pixel position signal PD_CTRL, and may thus generate the second row selection signal SX' using the selected signal. Although the first row selection signal SX and the second row selection signal SX' may have the same waveform in the normal mode, the second row selection signal SX' for use in the binning mode may have a different waveform through which a color pixel that is coupled to the same column line as the phase detection pixel PD and is accessed simultaneously with the phase detection pixel PD is prevented from outputting a signal to the column line.

Figure 11:
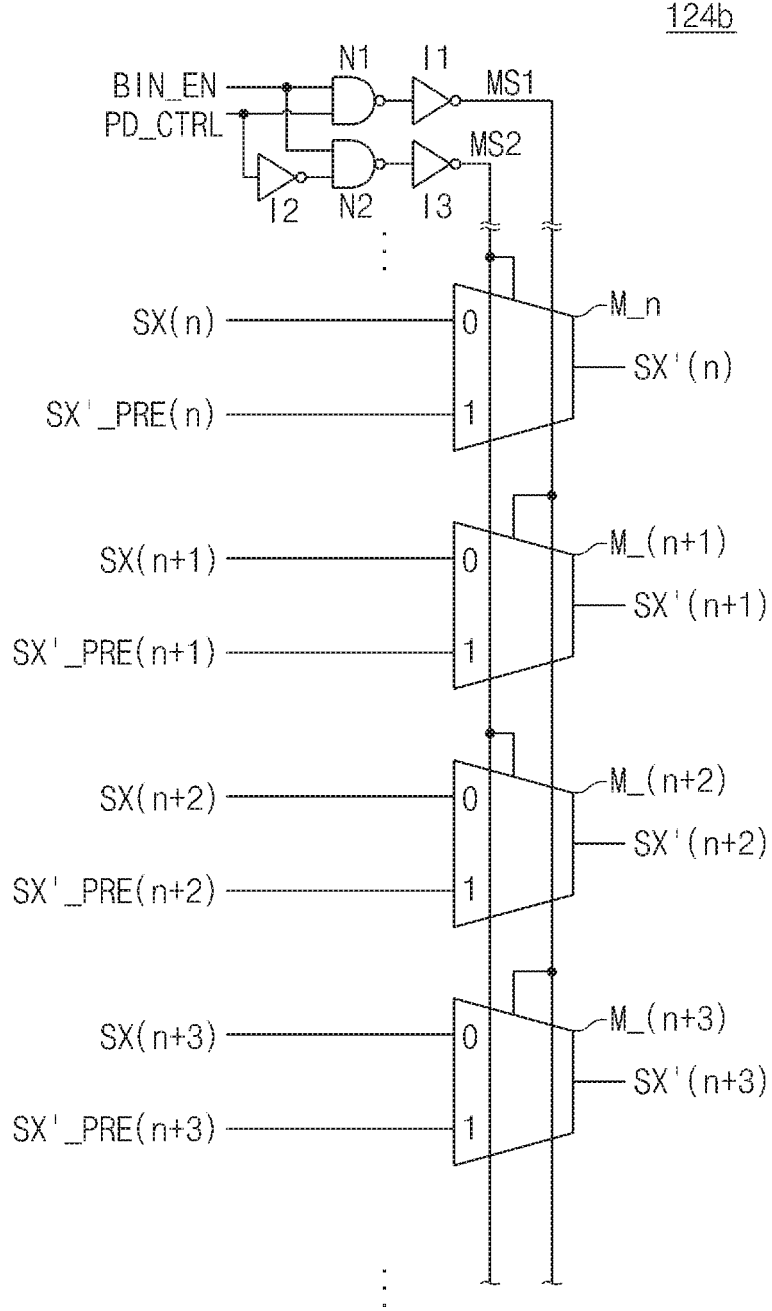
FIG. 11 is a circuit diagram illustrating one example of a second signal generator shown in FIG. 10.

FIG. 11 is a circuit diagram illustrating the second signal generator 124b shown in FIG. 10.

Referring to FIG. 11, although the second signal generator 124b includes constituent elements needed to generate the second row selection signals SX'(n)~SX'(n+3) to be supplied to the pixel group PG, the scope or spirit of the disclosed technology is not limited thereto, and it should be noted that the second signal generator 124b may further include other constituent elements needed to generate the second row selection signals to be supplied to other rows different from those of the pixel group PG as necessary.

The second signal generator 124b may include a plurality of NAND gates, a plurality of inverters, and a plurality of multiplexers.

The first NAND gate N1 may output the result of a NAND operation between the binning enable signal BIN_EN and the pixel position signal PD_CTRL to the first inverter I1. The first inverter I1 may output the first MUX selection signal MS1 by inverting an input signal thereof.

The second inverter I2 may invert the pixel position signal PD_CTRL, and may thus output the inverted pixel position signal PD_CTRL. The second NAND gate N2 may output the result of a NAND operation between the binning enable signal BIN_EN and the output signal of the second inverter I2 to the third inverter I3. The third inverter I3 may invert the input signal, and may thus output a second MUX selection signal MS2.

The first and second NAND gates N1 and N2 and the first to third inverters I1~I3 will hereinafter be generically referred to as an output selection circuit.

In this case, the first MUX selection signal MS1 indicating the output signal of the first inverter I1 may be transmitted to a selection terminal of second and fourth multiplexers M_(n+1) and M_(n+3) that respectively supply the second row selection signals SX'(n+1) and SX'(n+3) to the second pixel PX2. In addition, the second MUX selection signal MS2 indicating the output signal of the third inverter I3 may be transmitted to a selection terminal of first and third multiplexers M_n and M_(n+2) that respectively supply the second row selection signals SX'(n) and SX'(n+2) to the first pixel PX1 that is coupled to the same column line as the second pixel PX2 in the binning mode and is accessed simultaneously with the second pixel PX2 in the binning mode.

Each of the first to fourth multiplexers M_n~M_(n+3) may output an input signal to be received at an input terminal "1" or "0" according to the first or second MUX selection signal MS1 or MS2 to be supplied to the selection terminal. In other words, if the first or second MUX selection signal MS1 or MS2 is at a high level, the corresponding multiplexer may allow an input signal received at the input terminal "1" to be output as the row selection signal. In addition, if the first or second MUX selection signal MS1 or MS2 is at a low level, the corresponding multiplexer may allow an input signal received at the input terminal "0" to be output as the row selection signal.

The first row selection signal SX(n) may be input to the input terminal "0" of the first multiplexer M_n, the first row selection signal SX(n+1) may be input to the input terminal "0" of the second multiplexer M_(n+1), the first row selection signal SX(n+2) may be input to the input terminal "0" of the third multiplexer M_(n+2), and the first row selection signal SX(n+3) may be input to the input terminal "0" of the fourth multiplexer M_(n+3). In this case, the first row selection signals SX(n)~SX(n+3) may be generated based on the row address signal ROW_ADD and the first row selection input signal SX_IN, and may have the same waveforms as those of the first row selection signals SX(n)~SX(n+3) generated by the first signal generator 122b. In accordance with the embodiment, the second signal generator 124b may generate the first row selection signals SX(n)~SX(n+3) independently from the first signal generator 122b, and may receive the first row selection signals SX(n)~SX(n+3) from the first signal generator 122b as necessary.

A preliminary row selection signal SX'_PRE(n) may be input to the input terminal "1" of the first multiplexer M_n. A preliminary row selection signal SX'_PRE(n+1) may be input to the input terminal "1" of the second multiplexer M_(n+1). A preliminary row selection signal SX'_PRE(n+2) may be input to the input terminal "1" of the third multiplexer M_(n+2). A preliminary row selection signal SX'_PRE(n+3) may be input to the input terminal "1" of the fourth multiplexer M_(n+3). The preliminary row selection signals SX'_PRE(n)~SX'_PRE(n+3) may be generated based on the row address signal ROW_ADD and the second row selection input signal SX'_IN. That is, the preliminary row selection signals SX'_PRE(n)~SX'_PRE(n+3) may be used to transmit the second row selection input signal SX'_IN to at least one row selected by the row address signal ROW_ADD. For example, if the row address signal ROW_ADD indicates the m-th row, the preliminary row selection signal SX'_PRE(m) corresponding to the m-th row may have the same waveform as the second row selection input signal SX'_IN, and the remaining row selection signals corresponding to the remaining rows other than the m-th row may be maintained at a constant level (e.g., a low level).

To this end, although the second signal generator 124b may further include a structure (not shown) for generating the first low selection signals SX(n)~SX(n+3) and a structure (not shown) for generating the preliminary row selection signals SX'_PRE(n)~SX'_PRE(n+3) as necessary, the scope or spirit of the disclosed technology is not limited thereto.

If the binning enable signal BIN_EN is at a low level (i.e., a normal mode), each of the first MUX selection signal MS1 and the second MUX selection signal MS2 corresponding to the output signal of the output selection circuit is at a low level. Therefore, the first multiplexer M_n may output the first row selection signal SX(n) received at the input terminal "0" as the second row selection signal SX'(n) without change. The second multiplexer M_(n+1) may output the first row selection signal SX(n+1) received at the input terminal "0" as the second row selection signal SX'(n+1) without change. The third multiplexer M_(n+2) may output the first row selection signal SX(n+2) received at the input terminal "0" as the third row selection signal SX'(n+2) without change. The fourth multiplexer M_(n+3) may output the first row selection signal SX(n+3) received at the input terminal "0" as the fourth row selection signal SX'(n+3) without change. That is, in the normal mode, the second row selection signals SX'(n), SX'(n+1), SX'(n+2), and SX'(n+3) may respectively have the same waveform as the first row selection signals SX(n), SX(n+1), SX(n+2), and SX(n+3).

If the binning enable signal BIN_EN is at a high level (i.e., the binning mode), the first MUX selection signal MS1 and the second MUX selection signal MS2 corresponding to the output signals of the output selection circuit may have different levels according to the pixel position signal PD_CTRL. If the first pixel PX1 and the second pixel PX2 have the same positional relationship as in FIG. 4, the pixel position signal PD_CTRL may have a low level. In this case, during the binning mode, the first MUX selection signal MS1 and the second MUX selection signal MS2 may have a low level and a high level, respectively. If the first pixel PX1 and the second pixel PX2 have another positional relationship opposite to the above-mentioned positional relationship, it should be noted that the pixel position signal PD_CTRL may also have a high level without departing from the scope or spirit of the disclosed technology.

Therefore, the second multiplexer M_(n+1) that receives the first MUX selection signal MS1 through a selection terminal thereof may output the first row selection signal SX(n+1) as the second row selection signal SX'(n+1) without change. The fourth multiplexer M_(n+3) that receives the first MUX selection signal MS1 through a selection terminal thereof may output the first row selection signal SX(n+3) as the second row selection signal SX'(n+3) without change. In the meantime, the first multiplexer M_(n) that receives the second MUX selection signal MS2 through a selection terminal thereof may output the preliminary row selection signal SX'_PRE(n) as the second row selection signal SX'(n). The third multiplexer M_(n+2) that receives the second MUX selection signal MS2 through a selection terminal thereof may output the preliminary row selection signal SX'_PRE(n+2) as the second row selection signal SX'(n+2).

In this case, when the preliminary row selection signals SX'_PRE(n) and SX'_PRE(n+2) are respectively compared with the first row selection signals SX(n+1) and SX(n+3), the preliminary row selection signals SX'_PRE(n) and SX'_PRE(n+2) may be at a low level in a time section in which there is a need to output the pixel signal of the sub-pixel P0 disposed in the first pixel PX1 that is coupled to the same column line as the second pixel PX2 and is accessed simultaneously with the second pixel PX2 in the binning mode, differently from the first row selection signals SX(n+1) and SX(n+3).

Specifically, according to the second signal generator 124b shown in FIG. 11, signals to be input to the input terminals "0" and "1" of each of the first to fourth multiplexers M_n~M_(n+3) may be processed without passing through a separate logical circuit, such that a time delay between the first row selection signal SX and the second row selection signal SX' can be eliminated, resulting in increased reliability in pixel driving.

Figure 12:
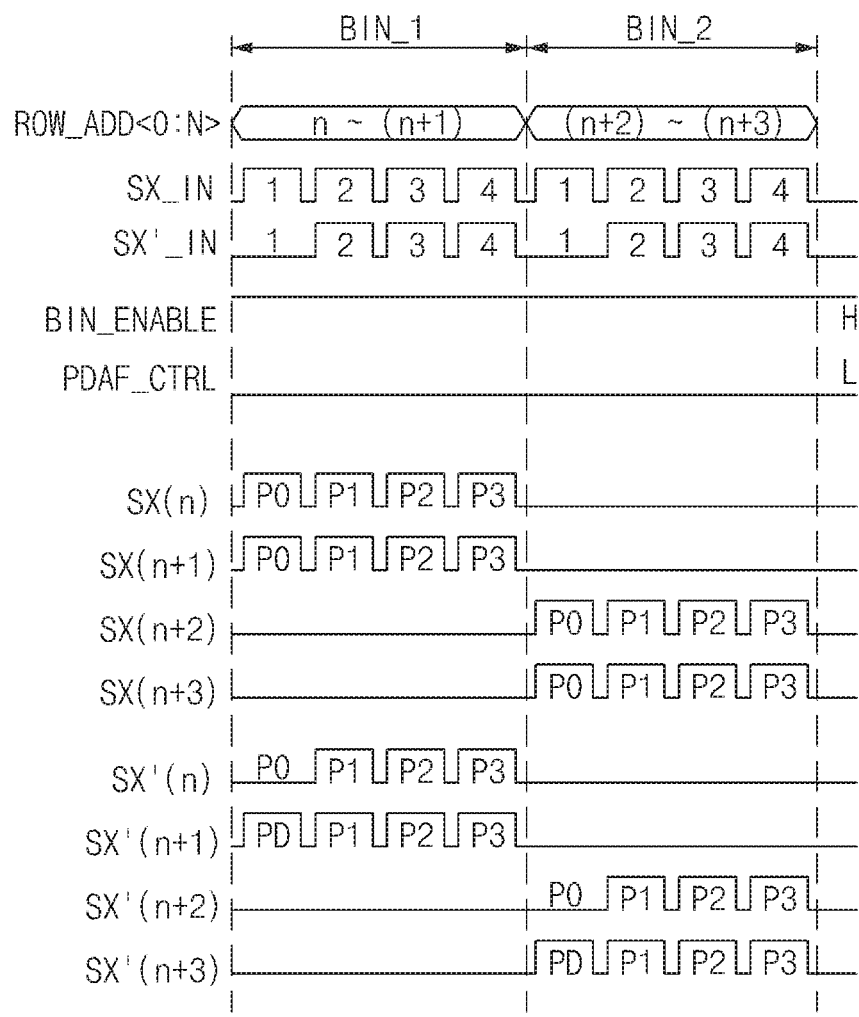
FIG. 12 is a timing diagram illustrating operations of a second signal generator shown in FIG. 11.

FIG. 12 is a timing diagram illustrating operations of the second signal generator 124b shown in FIG. 11.

Referring to FIG. 12, the first binning drive section BIN_1 may correspond to a time section in which the n-th row and the (n+1)-th row are simultaneously accessed. In addition, the second binning drive section BIN_2 may correspond to a time section in which the (n+2)-th row and the (n+3)-th row are simultaneously accessed. To this end, the row address signal ROW_ADD may include information of the n-th row and information of the (n+1)-th row during the first binning drive section BIN_1, and may include information of the (n+2)-th row and information of the (n+3)-th row during the second binning drive section BIN_2.

The first row selection input signal SX_IN may provide a time point at which the respective sub-pixels corresponding to the first to fourth positions of each of the first pixel PX1 and the second pixel PX2 can simultaneously generate and output the pixel signals. In this case, the first to fourth positions may denote the position of the sub-pixel P0 or P0 (see FIG. 2), the position of the sub-pixel P1 (see FIG. 2), the position of the sub-pixel P2 (see FIG. 2), and the position of the sub-pixel P3 (see FIG. 2), respectively.

The second row selection input signal SX'_IN may have a low level only in a specific section corresponding to the sub-pixel of the first position in the first row selection input signal SX_IN, and may have the same waveform as the first row selection input signal SX_IN in the remaining sections other than the specific section in the first row selection input signal SX_IN.

In addition, since a current mode is the binning mode, the binning enable signal BIN_EN may have a high level, and the pixel position signal PD_CTRL may have a low level according to the positional relationship of the pixels shown in FIG. 4.

As can be seen from the timing diagram of FIG. 12, the first signal generator 122b of the row decoder 120b may generate first row selection signals SX(n) and SX(n+1) in the first binning drive section BIN_1, such that pixel signals of the sub-pixels P0~P3 of the first pixel PX1 receiving the first row selection signals SX(n) and SX(n+1) can be sequentially output to the corresponding column line during the first binning drive section BIN_1. Thereafter, the first signal generator 122b of the row decoder 120b may generate first row selection signals SX(n+2) and SX(n+3) in the second binning drive section BIN_2, such that pixel signals of the sub-pixels P0~P3 of the first pixel PX1 receiving the first row selection signals SX(n+2) and SX(n+3) can be sequentially output to the corresponding column line during the second binning drive section BIN_2.

In addition, the second signal generator 124b of the row decoder 120b may generate the second row selection signal SX'(n+1) in the first binning drive section BIN_1, such that pixel signals of the sub-pixels PD and P1~P3 of the second pixel PX2 receiving the second row selection signal SX'(n+1) can be sequentially output to the corresponding column line during the first binning drive section BIN_1. Thereafter, the second signal generator 124b of the row decoder 120b may generate the second row selection signal SX'(n) in the first binning drive section BIN_1, such that pixel signals of the sub-pixels P1~P3 other than the sub-pixel P0 corresponding to the first position of the first pixel PX1 can be sequentially output to the corresponding column line during the first binning drive section BIN_1. As a result, the pixel signal of the sub-pixel PD of the second pixel PX2 may be output to the column line without interference with other signals, such that the resultant output signal may be used to perform autofocus.

Likewise, the second signal generator 124b of the row decoder 120b may generate the second row selection signal SX'(n+3) in the second binning drive section BIN_2, such that pixel signals of the sub-pixels PD and P1~P3 of the second pixel PX2 receiving the second row selection signal SX'(n+3) can be sequentially output to the corresponding column line during the second binning drive section BIN_2. Thereafter, the second signal generator 124b of the row decoder 120b may generate the second row selection signal SX'(n+2) in the second binning drive section BIN_2, such that pixel signals of the sub-pixels P1~P3 other than the sub-pixel P0 corresponding to the first position of the first pixel PX1 receiving the second row selection signal SX'(n+2) can be sequentially output to the corresponding column line during the second binning drive section BIN_2. As a result, the pixel signal of the sub-pixel PD of the second pixel PX2 may be output to the column line without interference with other signals, such that the resultant output signal may be used to perform autofocus.

In accordance with an embodiment of the present invention, the image sensor 100 may include a first sub-pixel array, a second sub-pixel array and the decoder 120.

The first sub-pixel array may correspond to the first pixel PX1 including the array of color sub-pixels P0 to P3, as described with reference to FIGS. 2 and 4.

The second sub-pixel array may correspond to the second pixel PX2 including the array of the phase detection sub-pixel PD and color sub-pixels P1 to P3, as described with reference to FIGS. 2 and 4.

The first and second sub-pixel arrays may be electrically coupled to a column line and different row selection lines SX'(n) and SX'(n+1), as exemplified in FIG. 4.

The decoder 120 may simultaneously provide the first and second sub-pixel arrays respectively with first and second row selection signals SX'(n) and SX'(n+1) through the row selection lines SX'(n) and SX'(n+1) in the binning mode.

The second row selection signal SX'(n+1) may allow the sub-pixels PD and P1 to P3 within the second sub-pixel array to sequentially output pixel signals through the column line, as exemplified in FIGS. 9 and 12.

The first row selection signal SX'(n) may allow the sub-pixels P1 to P3 within the first sub-pixel array to sequentially output pixel signals through the column line except for the sub-pixel P0 having the same turn to output a pixel signal as the phase detection sub-pixel PD within the first and second sub-pixel arrays, as exemplified in FIGS. 9 and 12.

That is, the image sensor 100 including the first and second sub-pixel arrays electrically coupled to the column line and disposed in different rows may allow the sub-pixels PD and P1 to P3 within the second sub-pixel array to sequentially output the pixel signals through the column line and may allow the sub-pixels P1 to P3 within the first sub-pixel array to sequentially output the pixel signals through the column line except for the sub-pixel P0 having the same turn to output a pixel signal as the phase detection sub-pixel PD within the first and second sub-pixel arrays.

The image sensor 100 may simultaneously allow, in the binning mode, the sub-pixels PD and P1 to P3 within the second sub-pixel array to sequentially output the pixel signals and the sub-pixels P1 to P3 within the first sub-pixel array to sequentially output the pixel signals, through the column line.

With the output pixel signals from the first and second sub-pixel arrays, an image signal processor may detect the phase difference even in the binning mode.

The image sensor 100 and the method for driving the same in accordance with the embodiment of the disclosed technology may normally acquire image data of the phase detection pixel even in the binning mode, such that the autofocus function can be persistently used even in the binning mode.

In addition, a simple circuit (i.e., the second signal generator 124a and 124b) may be added to the row decoder 120 and line arrangement for the pixel array 110 may be changed as shown in FIG. 4, such that the above-mentioned function can also be readily implemented.

It is understood that various embodiments and terminology used herein are not intended to limit technical ideas described in this document to specific embodiments, but rather to include various modifications, equivalents, and/or alternatives of the embodiments. Wherever possible, the same reference numbers will be used throughout the drawings to refer to the same or like portions. As used in the specification and appended claims, the terms "a", "an", "one", "the" and other similar terms include both singular and plural forms, unless context clearly dictates otherwise. A singular representation may include a plural representation unless otherwise stated in context. In the present application, an expression such as "A or B", "at least one of A and B", "at least one of A or B", "A, B or C", "at least one of A, B and C", or "at least one of A, B, or C" may include all possible combinations of one or more items selected from among listed related items. An expression such as "first" and "second" used in the present application may indicate corresponding constituent elements regardless of order and/or importance, is used to distinguish a constituent element from another constituent element, and does not limit corresponding constituent elements. When it is described that a constituent element (e.g., a first constituent element) is "(functionally or communicatively) coupled to" or is "connected to" another constituent element (e.g., a second constituent element), it should be understood that the constituent element may be directly (e.g., by wire) connected to the other constituent element, may be wirelessly connected to the other constituent element, or may be connected to the other constituent element through another constituent element (e.g., a third constituent element).

The term "module" as used in the present application includes a unit configured with hardware, software, or firmware and may be interchangeably used with a term such as a logic, logic block, component, or circuit. The term "module" may be an integrally configured component or a minimum unit or a portion thereof that performs at least one function. The term "module" may be implemented mechanically or electronically and may include, for example, an application-specific integrated circuit (ASIC).

Various embodiments of the present application may be implemented as software (e.g., program) including one or more instructions stored in a storage medium (e.g., on-board memory or external memory) readable by a machine (e.g., electronic device). For example, a processor (e.g., processor) of the machine (e.g., the electronic device) may retrieve at least one instruction from among the instructions stored in the storage medium, and may execute the retrieved instruction, such that the machine can operate to perform at least one function in response to the at least one retrieved instruction. The one or more instructions may include code generated by a compiler or code capable of being executed by an interpreter. The machine-readable storage medium may be implemented as a non-transitory storage medium. In this case, the term "non-transitory storage medium" may indicate that the storage medium is a tangible device and does not include signals (e.g., electromagnetic waves), and the term "non-transitory" does not discriminate between one case in which data is permanently stored in the storage medium and the other case in which data is temporarily stored in the storage medium.

In accordance with various embodiments, methods in accordance with various embodiments disclosed in the present application may be contained in a computer program product, and may then be provided to users. The computer program products may be traded between sellers and buyers as goods. The computer program product may be implemented as a machine-readable storage medium (e.g., a compact disc read only memory CD-ROM) and then rapidly distributed to users. Alternatively, the computer program product may be directly distributed to two user devices (e.g., smartphones), may be distributed to two user devices (e.g., smartphones) through an application store (e.g., PlayStore™), or may be distributed online to two user devices (e.g., smartphones) (e.g., downloaded or uploaded). In online distribution, at least a portion of the computer program product may be temporarily or provisionally stored in a machine-readable storage medium, for example, a server of a manufacturing company, a server of an application store, or a memory of a relay server.

In accordance with various embodiments, each (e.g., a module or program) of the above-mentioned constituent elements may include one or more entities. In accordance with various embodiments, at least one constituent element from among the above-mentioned constituent elements or at least one operation may be omitted, or one or more other constituent elements or one or more other operations may be added. Alternatively or additionally, the plurality of constituent elements (e.g., modules or programs) may be integrated into only one constituent element. In this case, the integrated constituent element may perform one or more functions of each of the plurality of constituent elements in the same way as or in a similar way to the previous operation that has been executed by the corresponding constituent element from among the plurality of constituent elements prior to execution of such integration. In accordance with various embodiments, operations performed by a module, a program, or another constituent element may be sequentially, parallelly, repeatedly, or heuristically executed, at least one of the above operations may be executed in different order or omitted, or another operation may be added.

As is apparent from the above description, the image sensor and the method for driving the same in accordance with the embodiments of the disclosed technology may normally acquire an image of one or more phase detection (PD) pixels even in the binning mode, and may thus persistently use the autofocus function even in the binning mode.

The image sensor and the method for driving the same in accordance with the embodiment of the disclosed technology may add a simple circuit (i.e., the second signal generator 124a and 124b) to a row decoder, and may change arrangement of lines (or wires) of a pixel array as shown in FIG. 4, such that the PD pixel image can be normally acquired even in the binning mode and at the same time the autofocus function can be persistently used even in the binning mode.

The embodiments of the disclosed technology may provide a variety of effects capable of being directly or indirectly recognized through the above-mentioned patent document.

Those skilled in the art will appreciate that the disclosed technology may be carried out in other specific ways than those set forth herein without departing from the spirit and essential characteristics of the disclosed technology. The above embodiments are therefore to be construed in all aspects as illustrative and not restrictive. The scope of the disclosed technology should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment of the disclosed technology or included as a new claim by a subsequent amendment after the application is filed.

Although a number of illustrative embodiments consistent with the disclosed technology have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. An image sensor comprising:
    a pixel array including plural first pixels and a second pixel; and
    a row decoder configured to supply a second row selection signal to the second pixel and a first pixel that is coupled to the same column line as the second pixel and is accessed simultaneously with the second pixel in a binning mode, and supply a first row selection signal to a remaining first pixel,
    wherein the second row selection signal is controlled in a manner that a pixel signal of a color pixel of the first pixel, which is accessed simultaneously with a phase detection pixel of the second pixel, is not output to the column line.

2. The image sensor according to claim 1, wherein the second row selection signal has a high level in a section corresponding to the phase detection pixel of the second pixel, and has a low level in a section corresponding to a color pixel of the first pixel that is accessed simultaneously with the phase detection pixel.

3. The image sensor according to claim 1, wherein:
    each of the first pixels is a shared pixel provided with a plurality of color pixels; and
    the second pixel is a shared pixel provided with at least one phase detection pixel.

4. The image sensor according to claim 3, wherein:
    the plurality of color pixels disposed in each of the first pixels is arranged in a Bayer pattern; and
    the phase detection pixel disposed in the second pixel is arranged at a position of a green pixel of the Bayer pattern.

5. The image sensor according to claim 1, wherein the phase detection pixel disposed in the second pixel is a half-shielded pixel.

6. The image sensor according to claim 1, wherein the row decoder includes:
    a first signal generator configured to generate the first row selection signal that transmits a row selection input signal to at least one row selected by a row address signal; and
    a second signal generator configured to generate the second row selection signal based on a binning enable signal indicating whether the binning mode is activated, a pixel position signal decided by an arrangement relationship between the first pixel and the second pixel, the first row selection signal, and a pixel masking signal by which a pixel signal of a color pixel of the first pixel that is accessed simultaneously with a phase detection pixel of the second pixel is controlled not to be output to the column line.

7. The image sensor according to claim 6, wherein the second signal generator includes an output selection circuit configured to generate a first multiplexer (MUX) selection signal based on the binning enable signal and the pixel position signal, and generate a second multiplexer (MUX) selection signal based on the binning enable signal and an inversion value of the pixel position signal.

8. The image sensor according to claim 7,
    wherein the second signal generator further includes a plurality of multiplexers configured to receive any one of the first multiplexer (MUX) selection signal and the second multiplexer (MUX) selection signal through a selection terminal, and
    wherein each of the multiplexers selects any one of the first row selection signal and a specific signal that is generated based on the first row selection signal and the pixel masking signal, and outputs the selected signal as the second row selection signal.

9. The image sensor according to claim 8, wherein:
    the multiplexer receiving the first multiplexer (MUX) selection signal outputs the second row selection signal to the second pixel; and
    the multiplexer receiving the second multiplexer (MUX) selection signal outputs the second row selection signal to the first pixel.

10. The image sensor according to claim 8, wherein the pixel masking signal is configured to have a low level in a section in which a pixel signal of the phase detection pixel of the second pixel is output.

11. The image sensor according to claim 1, wherein the row decoder includes:
    a first signal generator configured to generate the first row selection signal that transmits a first row selection input signal to at least one row selected by a row address signal; and
    a second signal generator configured to generate the second row selection signal based on a binning enable signal indicating whether the binning mode is activated, a pixel position signal decided by an arrangement relationship between the first pixel and the second pixel, the first row selection signal, and a second row selection input signal that provides a time point at which a pixel signal of each color pixel of the first pixel that is accessed simultaneously with a phase detection pixel of the second pixel is prevented from being output to the column line.

12. The image sensor according to claim 11, wherein the second signal generator includes an output selection circuit configured to generate a first multiplexer (MUX) selection signal based on the binning enable signal and the pixel position signal, and generate a second multiplexer (MUX)

selection signal based on the binning enable signal and an inversion value of the pixel position signal.

13. The image sensor according to claim 12,
wherein the second signal generator further includes a plurality of multiplexers configured to receive any one of the first multiplexer (MUX) selection signal and the second multiplexer (MUX) selection signal through a selection terminal, and
wherein each of the multiplexers selects any one of the first row selection signal and a preliminary row selection signal that is generated based on the second row selection signal and the row address signal, and outputs the selected signal as the second row selection signal.

14. The image sensor according to claim 13, wherein:
the multiplexer receiving the first multiplexer (MUX) selection signal outputs the second row selection signal to the second pixel; and
the multiplexer receiving the second multiplexer (MUX) selection signal outputs the second row selection signal to the first pixel.

15. The image sensor according to claim 13, wherein the preliminary row selection signal is configured to have a low level in a section in which a pixel signal of the phase detection pixel of the second pixel is output.

16. A method for driving an image sensor provided with a pixel array comprised of plural first pixels and a second pixel, the method comprising:
generating a second row selection signal to be supplied to the second pixel and a first pixel that is coupled to the same column line as the second pixel and is accessed simultaneously with the second pixel in a binning mode; and
generating a first row selection signal to be supplied to a remaining first pixel,
wherein the second row selection signal is controlled in a manner that a pixel signal of a color pixel of the first pixel, which is accessed simultaneously with a phase detection pixel of the second pixel, is not output to the column line.

17. The method according to claim 16,
wherein the generating the second row selection signal includes generating the second row selection signal based on a pixel masking signal and the first row selection signal, and
wherein the pixel masking signal has a low level only in a section in which a pixel signal of a phase detection pixel of the second pixel is output.

18. The method according to claim 16, wherein the generating the second row selection signal includes generating a preliminary row selection signal that has a low level in a section in which pixel signal of phase detection pixel of the second pixel is output, as the second row selection signal.

19. An image processing system comprising:
an image sensor including:
a pixel array provided with plural first pixels and a second pixel; and
a row decoder configured to supply a second row selection signal to the second pixel and a first pixel that is coupled to the same column line as the second pixel and is accessed simultaneously with the second pixel in a binning mode, and supply a first row selection signal to a remaining first pixel; and
an image signal processor configured to detect a phase difference using an image of the second pixel in the binning mode,
wherein the second row selection signal is controlled in a manner that a pixel signal of a color pixel of the first pixel, which is accessed simultaneously with a phase detection pixel of the second pixel, is not output to the column line.

20. An image sensor comprising:
a first sub-pixel array;
a second sub-pixel array including a phase detection sub-pixel, the first and second sub-pixel arrays electrically coupled to a column line and different row selection lines; and
a decoder configured to simultaneously provide the first and second sub-pixel arrays respectively with first and second row selection signals through the row selection lines in a binning mode,
wherein the second row selection signal allows sub-pixels within the second sub-pixel array to sequentially output pixel signals through the column line,
wherein the first row selection signal allows sub-pixels within the first sub-pixel array to sequentially output pixel signals through the column line except for a sub-pixel having the same turn to output a pixel signal as the phase detection sub-pixel within the first and second sub-pixel arrays.

* * * * *